United States Patent
Caplan

(10) Patent No.: US 10,009,115 B2
(45) Date of Patent: Jun. 26, 2018

(54) OPTICAL RECEIVER CONFIGURABLE TO ACCOMMODATE A VARIETY OF MODULATION FORMATS

(75) Inventor: David O. Caplan, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1016 days.

(21) Appl. No.: 13/462,555

(22) Filed: May 2, 2012

(65) Prior Publication Data

US 2012/0281990 A1 Nov. 8, 2012

Related U.S. Application Data

(60) Provisional application No. 61/481,360, filed on May 2, 2011.

(51) Int. Cl.
*H04B 10/04* (2006.01)
*H04B 10/12* (2006.01)
*H04B 10/67* (2013.01)

(52) U.S. Cl.
CPC .................... *H04B 10/67* (2013.01)

(58) Field of Classification Search
CPC ....................................... H04B 10/67
(Continued)

(56) References Cited

U.S. PATENT DOCUMENTS 5,118,190 A * 6/1992 Jurga .................. G01C 19/725
356/466
5,574,589 A * 11/1996 Feuer .................... H04B 10/27
359/341.2

(Continued)

FOREIGN PATENT DOCUMENTS

WO WO 2002/091645 A 11/2002
WO WO 2006/071744 A1 7/2006
(Continued)

OTHER PUBLICATIONS

Gnauck, A. H., et al., "2.5 Tb/s (64×42.7 Gb/s) transmission over 40×100 km NZDSF using RZ-DPSK format and all-Raman-amplified spans." Paper FC2 presented at OFC Conference (2002). 3 pages.

(Continued)

*Primary Examiner* — David Payne
*Assistant Examiner* — Pranesh Barua
(74) *Attorney, Agent, or Firm* — Hamilton, Brook, Smith & Reynolds, P.C.

(57) ABSTRACT

The present invention provides a simple means of demodulating optical signals, e.g. wideband M-ary orthogonal. The demodulator comprises an optical processor and a comparison module. The optical processor transforms M input optical signals into 2 $\log_2(M)$ intermediary optical signals and the comparison module determines the logical representation of the input data based on $\log_2(M)$ binary comparisons of the optical power of the intermediary signals. Example embodiments may be reconfigurable to receive optical signals using M-FSK, M-PPM, M-PolSK, and hybrid M-ary orthogonal modulation formats. Example embodiments also offer small size, weight and power consumption for both free-space and fiber optic environments as well as improved receiver sensitivity and reduced electron bandwidth requirements.

29 Claims, 17 Drawing Sheets

(58) Field of Classification Search
USPC .................. 398/185, 187, 188, 202–214
See application file for complete search history.

(56) References Cited

U.S. PATENT DOCUMENTS

| | | | |
|---|---|---|---|
| 5,764,830 A * | 6/1998 | Pan ...................... | G02B 6/2856 385/39 |
| 6,154,583 A * | 11/2000 | Kuroyanagi ....... | H04Q 11/0003 385/15 |
| 6,262,820 B1 * | 7/2001 | Al-Salameh ........ | H04J 14/0283 370/216 |
| 6,262,821 B1 * | 7/2001 | Fevrier .............. | H04J 14/0204 370/359 |
| 6,396,605 B1 | 5/2002 | Heflinger et al. | |
| 6,480,309 B1 * | 11/2002 | Lee .................... | H04Q 11/0005 385/16 |
| 6,571,038 B1 * | 5/2003 | Joyner ................ | G02B 6/2813 385/27 |
| 6,661,975 B1 | 12/2003 | Hall et al. | |
| 6,694,104 B1 | 2/2004 | Caplan et al. | |
| 6,785,446 B1 | 8/2004 | Chandrasekhar et al. | |
| 6,826,371 B1 | 11/2004 | Bauch et al. | |
| 6,831,779 B2 | 12/2004 | Caplan | |
| 6,882,766 B1 * | 4/2005 | Corbalis ............. | H04Q 11/0005 385/16 |
| 7,035,543 B1 | 4/2006 | Hoshida et al. | |
| 7,181,097 B2 | 2/2007 | Caplan et al. | |
| 7,221,815 B2 * | 5/2007 | Smith .................... | H04J 14/02 385/13 |
| 7,233,430 B2 | 6/2007 | Caplan | |
| 7,411,726 B2 | 8/2008 | Caplan | |
| 7,414,728 B2 | 8/2008 | Caplan | |
| 7,986,878 B2 | 7/2011 | Saunders et al. | |
| 8,111,986 B1 * | 2/2012 | Lindsay ............. | H04B 10/0731 398/16 |
| 9,264,147 B2 | 2/2016 | Caplan et al. | |
| 9,264,149 B2 | 2/2016 | Tseng | |
| 9,647,765 B2 | 5/2017 | Caplan et al. | |
| 2001/0013934 A1 * | 8/2001 | Varnham ............. | G01D 5/35383 356/478 |
| 2002/0044315 A1 * | 4/2002 | Sugawara ........... | H04J 14/0204 398/45 |
| 2004/0135172 A1 * | 7/2004 | Yoshida .............. | G02B 6/12007 257/200 |
| 2004/0207912 A1 * | 10/2004 | Nagel ................ | H01S 3/094003 359/341.3 |
| 2004/0258423 A1 * | 12/2004 | Winzer ................ | H04B 10/677 398/202 |
| 2005/0012986 A1 * | 1/2005 | Kakui ................. | H01S 3/06795 359/333 |
| 2005/0031347 A1 | 2/2005 | Soto et al. | |
| 2005/0185968 A1 | 8/2005 | Dorrer et al. | |
| 2005/0232630 A1 * | 10/2005 | Beshai ............... | H04J 14/0241 398/45 |
| 2005/0260000 A1 | 11/2005 | Domagala | |
| 2005/0281505 A1 * | 12/2005 | Smith .................... | H04J 14/02 385/24 |
| 2006/0056845 A1 * | 3/2006 | Parsons ................ | H04L 27/223 398/41 |
| 2006/0139735 A1 * | 6/2006 | Caplan ................ | H04B 10/67 359/325 |
| 2006/0251423 A1 * | 11/2006 | Evangelides, Jr. ....................... H04B 10/07955 398/105 | |
| 2006/0268704 A1 | 11/2006 | Ansari et al. | |
| 2006/0274320 A1 | 12/2006 | Caplan | |
| 2007/0104493 A1 | 5/2007 | Kimura | |
| 2007/0116468 A1 * | 5/2007 | Ji ............................ | H04J 14/02 398/79 |
| 2007/0206963 A1 | 9/2007 | Koc | |
| 2007/0216988 A1 * | 9/2007 | Caplan ..................... | H04J 14/02 359/325 |
| 2008/0085118 A1 * | 4/2008 | Effenberger ........ | H04J 14/0282 398/82 |
| 2008/0133983 A1 * | 6/2008 | Simmons ................ | H04L 1/203 714/704 |
| 2008/0137179 A1 | 6/2008 | Li et al. | |
| 2008/0285977 A1 * | 11/2008 | Caplan ................. | H04B 10/504 398/130 |
| 2009/0136240 A1 | 5/2009 | Malouin et al. | |
| 2009/0196602 A1 | 8/2009 | Saunders et al. | |
| 2009/0297162 A1 | 12/2009 | Kai et al. | |
| 2010/0034534 A1 | 2/2010 | Niibe | |
| 2010/0061729 A1 | 3/2010 | Weeber | |
| 2010/0232795 A1 | 9/2010 | Wang et al. | |
| 2010/0232796 A1 * | 9/2010 | Cai ...................... | H04B 10/677 398/79 |
| 2010/0260496 A1 * | 10/2010 | Tosetti ............... | H04B 10/2587 398/7 |
| 2010/0266291 A1 | 10/2010 | Boffi et al. | |
| 2011/0129232 A1 * | 6/2011 | Dou ................. | H04B 10/50595 398/183 |
| 2011/0229074 A1 * | 9/2011 | Jeong ..................... | G02B 6/125 385/28 |
| 2011/0243557 A1 * | 10/2011 | Croussore .......... | H04B 10/2557 398/45 |
| 2011/0274429 A1 | 11/2011 | Caplan et al. | |
| 2012/0106984 A1 * | 5/2012 | Jones .................... | H04B 10/60 398/214 |
| 2012/0170933 A1 * | 7/2012 | Doerr .................. | G02B 6/4204 398/48 |
| 2012/0189300 A1 * | 7/2012 | Lindsay ............... | H04B 17/345 398/26 |
| 2012/0224852 A1 * | 9/2012 | Liu ..................... | H04B 10/2507 398/65 |
| 2016/0134377 A1 | 5/2016 | Caplan et al. | |

FOREIGN PATENT DOCUMENTS

| | | |
|---|---|---|
| WO | WO 2007/103410 A2 | 9/2007 |
| WO | WO 2008/118411 A1 | 10/2008 |
| WO | WO 2008118411 A1 * | 10/2008 .......... H04B 10/677 |
| WO | WO 2011/119897 A2 | 9/2011 |
| WO | WO 2013/015859 A2 | 1/2013 |

OTHER PUBLICATIONS

Zhu, B., et al., "72-nm Continuous Single-Band Transmission of 3.56 Tb/s (89×42.7 Gb/s) Over 4000 km of NZDF Fiber," in Proc. OFC 2002 (2002).

International Search Report and the Written Opinion for International Application No. PCT/US2012/036164, "Optical Receiver Configurable to Accommodate a Variety of Modulation Formats," dated Feb. 22, 2013, 12 pages.

Caplan, D.O., et al., "Parallel Direct Modulation Laser Transmitters for High-speed High-sensitivity Laser Communications," in *CLEO: 2011—Laser Applications to Photonic Applications*, OSA Technical Digest (CD) (Optical Society of America, 2011), Post deadline paper PDPB12.

Hernandez, V.J., et al., "Performance Impact of Multiple Access Interference in a 4-ary Pulse Position Modulated Optical Code Division Multiple Access (PPM/O-CDMA) System," *Proc. IEEE Optical Fiber Communications Conf. (OFC)*, pp. 1652-1654 (2008).

Mendez, A.J., et al., "Design and Evaluation of a Virtual Quadrant Receiver for 4-ary Pulse Position Modulation/Optical Code Division Multiple Access (4-ary PPM/O-CDMA)," *Proc. SPIE 6457*, 64570H 1-6 (2007).

Mendez, A.J., et al., "Virtual Array Receiver Options for 64-ary Pulse Position Modulation (PPM)," in *Proc. SPIE 7199*, pp. 71990S-1-71990S-8 (2009).

Mendez, A.J., et al., "Design of Optical Pulse Position Modulation (PPM) Translating Receiver," *Proc. IEEE Photonics Society Annual Meeting LEOS*, pp. 18-19, (Oct. 2009).

Mendez, A.J., et al., "Transmitter and Translating Receiver Design for 64-ary Pulse Position Modulation (PPM)," *Proc. SPIE 7587*, 75870M (2010).

(56) References Cited

OTHER PUBLICATIONS

Mendez, A.J., et al., "Comparison of WDM/Pulse-Position-Modulation (WDM/PPM) with Code/Pulse-Position-Swapping (C/PPS) Based on Wavelength/Time Codes," *Avionics, Fiber-Optics and Photonics Conference* (2009).
Onohara, K., et al., "Soft-Decision-Based Forward Error Correction for 100 Gb/s Transport Systems," *IEEE Journal of Selected Topics in Quantum Electronics*, vol. 16 (5) pp. 1258-1267 (2010).
Stevens, M.L, et al., "A simple delay-line 4-PPM demodulator with near-optimum performance," *Optics Express*, vol. 20 (5) pp. 5270-5280 (Feb. 27, 2012).
"Pair", www.merriam-webster.com/dictionary/pair retrieved (May 21, 2013), pp. 1-4.
"NASA Space Communication and Navigation Architecture Recommendations for 2005-2030," (Space Communication Architecture Working Group Final Report). www.spacecomm.nasa.gov/spacecomm (2006).
Agrawal, G. P., *Nonlinear Fiber Optics, Second Edition* (New York: Academic Press)(1995).
Ajmal, T., et al., "Design of a 10 Gbps Optical Burst Mode DPSK Receiver for Data and Clock Recovery." Paper presented at ECOC (2008).
Alexander, S. B., *Optical Communication Receiver Design* (Bellingham, WA: SPIE Press) (1997).
Andersson, P. O., and Akermark, K., "Accurate optical extinction ratio measurements," *IEEE Photonics Technology Letters*, 6(11): 1356-1358 (1994).
Andrews, L.C., and Phillips, A. J., *Laser Beam Propagation through Random Media*, $2^{nd}$ Edition (Bellingham, WA: SPIE Press) (2005).
Atia, W.A., and Bondurant, R.S., "Demonstration of Return-to-Zero Signaling in Both OOK and DPSK Formats to Improve Receiver Sensitivity in an Optically Preamplified Receiver," in Proc. LOES $12^{th}$ Annual Meeting, vol. 1, 226-227 (1999).
Cai, J.-X., et al., "A DWDM Demonstration of 3.73 Tb/s over 11,000 km using 373 RZ-DPSK channels at 10 Gb/s." Paper PD22 presented at OFC Conference (2003). 3 pages.
Caplan, D, O., et al., "Demonstration of Optical DPSK Communication with 25 Photons/Bit Receiver Sensitivity." Paper CFH5 presented at CLEO (2006).
Caplan, D. O., "DPSK Low-Rate Options," (Program 1804). MIT Lincoln Laboratory (2009).
Caplan, D. O., "Laser Communication Transmitter and Receiver Design," in *J. Opt. Fiber. Communications, Rep. 4*, pp. 225-362 (2007).
Caplan, D. O., et al., "Demonstration of 2.5-Gslot/s optically-preamplified M-PPM with 4 photons/bit receiver sensitivity." Paper PDP32 presented at OFC Conference (2005). 2 pages.
Caplan, D. O., et al., "Free-space Lasercom: Global Communications and Beyond." Presentation slides from ECOC (2009).
Caplan, D. O., et al., "High-Sensitivity Demodulation of Multiple-Data-Rate WDM-DPSK Signals using a Single Interferometer." Paper OThD3 presented at OFC (2007).
Caplan, D. O., et al., "High-sensitivity multi-channel single-interferometer DPSK receiver," *Optics Express*, 14(23): 10984-10989 (2006).
Caplan, D. O., et al., "High-Sensitivity Variable-Rate Transmit/Receive Architecture," *IEEE*, pp. 297-298 (1999).
Caplan, D. O., et al., "Ultra-long Distance Free Space Laser Communications." Paper CWM1 presented at CLEO (2007).
Caplan, D. O., et al., "Ultra-wide-range Multi-rate Differential Phase Shift Keying (DPSK) Laser Communications." Presentation slides from CLEO (2010).
Caplan, D. O., et al., "Ultra-wide-range Multi-rate DPSK Laser Communications." Paper presented at OFC (2010).
Caplan, D.O., et al., "Performance of High-Rate High-Sensitivity Optical Communications with Forward Error Correction Coding," CLEO, CPDD9, May 2004.
Cerf, V., "Internet and the High Capacity Challenge," Plenary Speaker, SVP Internet Architecture World Com, 30 pages, Mar. 19, 2002.

Charlet, G., et al., "6.4 Tb/s (159×42.7Bg/s) Capacity Over 21×100 km Using Bandwidth-Limited Phase-Shaped Binary Transmission," in Proc. ECOC 2002, Postdeadline Paper PD4.1, (2002).
Choi, Z.-Y., and Lee, Y.-H., "Compensating Frequency Drift in DPSK Systems via Baseband Signal Processing," *IEEE Transactions on Communications*, 45(8): 921-924 (1997).
Edwards, C. D., et al., "NASA's Deep Space Telecommunications Road Map," (Telecom. and Mission Ops. Progress Report 42-136). Jet Propulsion Laboratory (1999). pp. 1-20.
Essiambre, R.-J., et al., "Capacity Limits of Optical Fiber Networks", *Journal of Lightwave Technology*, 28(4): 662-701 (2010).
Forney, G. D., Jr., "Burst-correcting codes for the classic bursty channel," *IEEE Trans. Comm. Technol.*, 19(5): 772-781 (1971).
Franklin, J., et al., "Generation of RZ-DPSK using a Chirp-Managed Laser (CML)." Paper JWA67 presented at OFC/NFOEC (2008).
Fukushima, M., et al., "Recent Progress of Erbium-Doped Fiber Amplifiers and Their Components", *Proc. of SPIE*, 6775: 12 pages (2007).
Gnauck, A. H. and Winzer, P. J. , "Optical phase-shift-keyed transmission," *J. Lightw. Technol.* 23(1) 115-130, (2005).
Gnauck, A. H., et al., "Optical Duobinary Format From Demodulation of DPSK Using Athermal Delay Interferometer," *IEEE Photonics Tech. Lett.*, 18(4) 637-639 (2006).
Gnauck, A.H., et al., "2.5 Tb/s (64×42.7 Gb/s) Transmission Over 40×100 km NZDSF Using RZ-DPSK Format and All-Raman-Amplified Spans," Paper FC2 presented at OFC Conference, 2002. 3 pages.
Gnauck, A.H., et al., "25×40-Gb/s Copolarized DPSK Transmission Over 12×100-km NZDF With 59-Ghz Channel Spacing," *IEEE Photonics Technology Letters*, vol. 15, No. 3, 467-469 (Mar. 2003).
Gnauk, A.H., et al., "Demonstration of 42.7-Gb/s DPSK Receiver with 45 Photons/Bit Sensitivity," *IEEE Photonics Technology Letters*, vol. 15, No. 1, 99-101 (Oct. 2003).
Gordon, J.P., "Random Walk of Coherently Amplified Solitons in Optical Fiber Transmission", *Optics Letters*, 11(10): 665-667 (1986).
Griffin, R.A., et al., "10 Gb/s optical differential quadrature phase shift key (DQPSK) transmission using GaAs/AlGaAs integration," in OFC, 2002.
Grosz, D.F., et al., "5.12 Tb/s (128×42.7 Gb/s) Transmission with 0.8 bit/s/Hz Spectral Efficiency Over 1280 km of Standard Single-Mode Fiber Using All-Raman Amplification and Strong Signal Filtering," in Proc. ECOC 2002, Postdeadline paer PD4.3, (2002).
Hewlett Packard, "Measuring extinction ratio of optical transmitters," Application Note 1550-8 (1998).
Hsieh, Y. C., et al., "Athermal Demodulator for 42.7-Gb/s DPSK Signals," in ECOC 2005 Proceedings—vol. 4., Glasgow, U.K., 2005, Paper Th 1.5.6.
Hung, W., et al., "An Optical Network Unit for WDM Access Networks with Downstream DPSK and Upstream Remodulated OOK Data Using Injection-Locked FP Laser," *IEEE Photonics Technology Letters*, v. 15, No. 10, 1476-1478, (Oct. 2003).
IEEE 100 The Authoritative Dictionary of IEEE Standards Terms, 2000, Standards Information Network IEEE Press, 7th Edition, pp. 272, 1200.
Ikura, M., and Adachi, F., "Baseband Feedforward Frequency Drift Compensation without False Phase Locking for Burst DPSK Signal Reception," *Electronics Letters*, 28(12): 1165-1167 (1992).
International Preliminary Report on Patentability in International Application No. PCT/US2012/036164, entitled "Optical Receiver Configurable to Accommodate a Variety of Modulation Formats," dated Nov. 14, 2013.
Kahn, J. M, and Ho, K.-P., "Spectral Efficiency Limits and Modulation/Detection Techniques for DWDM Systems," *IEEE Journal of Selected Topics in Quantum Electronics*, 10(2): 259-272 (2004).
Kazovsky, L. G., "Balanced Phase-Locked Loops for Optical Homodyne Receivers: Performance Analysis, Design Considerations, and Laser Linewidth Requirements," *Journal of Lightwave Technology*, LT-4(2): 182-195 (1986).
Kim, Hoon, "Cross-Phase-Modulation-Induced Nonlinear Phase Noise in WDM Direct-Detection DPSK Systems," *Journal of Lightwave Technology*, vol. 21, No. 8, 1770-1774 (Aug. 2003).

(56) References Cited

OTHER PUBLICATIONS

Kobayashi, S., and Fukada, Y., "A Burst-mode Packet Receiver with Bit-rate-discriminating Circuit for Multi-bit-rate Transmission System." Paper WX4 presented at LEOS (1999). pp. 595-596.

Kobayashi, S., and Hashimoto, M., "A Multibitrate Optical Burst-mode Packet Receiver." Paper TuD4 presented at LEOS (2001). pp. 165-166.

Kurumida, J., et al., "Simultaneous Multi-Format RZ-OOK and RZ-DPSK Optical Packet Switching Based on Tunable Four-Wave Mixing." Paper presented at IEEE Photonics Switching Conference (2009).

Leng, L., et al., "1.6 Tb/s(40×40 Gb/s) Transmission Over 500 km of Nonzero Dispersion Fiber with 100-km Amplified Spans Compensated by Extra-High-Slope Dispersion-Compensating Fiber," In Proc. OFC 2002 (2002).

Liu, F., et al., "1.6 Tbit/s (40×42.7 Gbit/s) Transmission Over 3600 km UltraWave™ Fiber with all-Raman Amplified 100 km Terrestrial Spans Using ETDM Transmitter and Receiver," in Proc. OFC 2002, (2002).

Liu, F., et al., "Experimental verification of a new model describing the influence of incomplete signal extinction ratio on the sensitivity degradation due to multiple interferometric crosstalk," *IEEE Photonics Technology Letters*, 11(1): 137-139 (1999).

Liu, Xiang, et al., "Athermal Optical Demodulator for OC-768 DPSK and RZ-DPSK Signals," *IEEE Phtonics Technology Letters*, 17(12) 2610-2612 (2005).

Livas, J. C., "High Sensitivity Optically Preamplified 10 Gb/s Receivers." Paper PD4 presented at OFC (1996).

Mendenhall, J. A., et al., "Design of an Optical Photon Counting Array Receiver System for Deep Space Communications," *Proc. IEEE*, 95(10): 2059-2069 (2007).

Minch, J. R., et al., "Adaptive Transceivers for Mobile Free-Space Optical Communications." Paper presented at IEEE MILCOM (2006).

Minch, J. R., et al., "Rate Adjustable NRZ-DPSK Modulation Scheme with a Fixed Interferometer," *2005 Digest of the LEOS Summer Topical Meetings*, pp. 43-44.

Miyamoto, Y., et al., "S-band WDM coherent transmission of 40×43-Gbit/s CS-RZ DPSK signals over 400 km DSF using hybrid GS-TDFAs/Raman amplifiers," *Electronics Letters*, 38(24): 1569-1570 (2002).

Mizuochi, T., et al., "Forward error correction based on block turbo code with 3-bit soft decision for 10-Gb/s optical communication systems," *IEEE J. Sel. Top Quantum Electron.*, 10(2): 376-386 (2004).

Nishizawa, H., et al.,"10-Gb/s Optical DPSK Packet Receiver Proof Against Large Power Fluctuations," *IEEE Photonics Technology Letters*, 11(6): 733-735 (1999).

Olmos, J. J. V., et al., "Self-Controlled All-Optical Label and Payload Separator for Variable Length Bursts in a Time-Serial IM/DPSK Scheme," *IEEE Photonics Technology Letters*, 17(8): 1692-1694 (2005).

Olmos, J. J. V., et al., "Self-controlled All-Optical label and payload separator for variable length bursts in a Time-Serial IM/DPSK Scheme." Paper OTuC6 presented at OFC (2005).

*Optical Fiber Telecommunications IIIA*, I.P. Kamionow and T.L. Koch, eds. (CA: Academic Press), 627 pages (1997).

Ota, Y., and Swartz, R. G., "Burst-Mode Compatible Optical Receiver With a Large Dynamic Range," *Journal of Lightwave Technology*, 8(12): 1897-1903 (1990).

Ota, Y., et al., "High-Speed, Burst-Mode, Packet-Capable Optical Receiver and Instantaneous Clock Recovery for Optical Bus Operation," *Journal of Lightwave Technology*, 12(2): 325-331 (1994).

Rasmussen, C., et al., "DWDM 40G transmission over trans-Pacific distance (10 000 km) using CSRZ-DPSK, enhanced FEC and all-Raman amplified 100 km UltraWave™ fiber spans." Paper PD18 presented at OFC (2003).

Rhee, J.K., et al., "DPSK 32×10 Gb/s Transmission Modeling on 5×90 km Terrestrial System," *IEEE Photonics Technology Letters*, vol. 12, No. 12, 1627-1629 (Dec. 2000).

Robinson, B. S., et al., "781-Mbit/s photon-counting optical communications using a superconducting nanowire detector," *Opt. Lett.*, 31(4): 444-446 (2006).

Rohde, M., et al., "Robustness of DPSK Direct Detection Transmission Format in Standard Fibre EDM Systems," *Electronics Letters*, vol. 36, No. 17, 1483-1484, (Aug. 2000).

Shinagawa, T., et al. "Detailed investigation on reliability of wavelength-monitor-integrated fixed and tunable DFB laser diode modules," *J. Lightwave Technology*, 23(3): 1126-1136 (2005).

Smutny, B., et al., "5.6 Gbps optical intersatellite communication link," *Proc. SPIE*, 7199(6): 1-8 (2009).

Spellmeyer, N.W., et al., "High-Sensitivity 40-Gb/s Rz-DPSK With Forward Error Correction." *IEEE Photonics Technology Letters*, vol. 16, No. 6, 1579-1581 (Jun. 2004).

Stevens, M. L., et al., "A novel variable-rate pulse-position modulation system with near quantum limited performance." PaperTuU5 presented at LEOS (1999). 2 pages.

Stevens, M. L., et al., "Optical Homodyne PSK Demonstration of 1.5 Photons per Bit at 156 Mbps with Rate-1/2 Turbo Coding," *Opt. Express*, 16(14): 10412-10420 (2008).

Su, C., et al., "Inherent Transmission Capacity Penalty of Burst-Mode Receiver for Optical Multiaccess Networks," *IEEE Photonics Technology Letters*, 6(5): 664-667 (1994).

Su, Y., et al., "Wide Dynamic Range 10-Gb/s DPSK Packet Receiver Using Optical-Limiting Amplifiers," *IEEE Photonics Technology Letters*, 16(1): 296-298 (2004).

Su., C., et al., "Theory of Burst-Mode Receiver and Its Applications in Optical Multiaccess Networks," *Journal of Lightwave Technology*, 15(4): 590-606 (1997).

Sun, Y., et al., "Optical Fiber Amplifiers for WDM Optical Networks", *Bell Labs Technical Journal*, pp. 187-206 (Mar. 1999).

Swanson, E.A., et al., "High Sensitivity Optically Preamplified Direct Detection DPSK Receiver with Active Delay-Line Stabilization," IEEE Photonics Technology Letters, vol. 6, No. 2, 263-265 (Feb. 1994).

Townes, S. A., et al., "The Mars laser communication demonstration." Paper presented at IEEE Aerospace Conf. (2004). pp. 1-15.

Vassilieva, O., et al., "Numerical Comparison of NRZ, CS-RZ and IM-DPSK Formats in 43Gbit/s WDM Transmission," in Proc. LEOS 14th Annual Meeting, (2001).

Vodhanel, R. S., and Elrefaie, A. F., "Performance of direct frequency modulation DFB lasers in multigigabit per second ASK, FSK, and DPSK lightwave systems." Paper TUI6 presented at OFC (1990).

Walther, F. G., et al., "A Process for Free-Space Laser Communications System Design," *Proc. SPIE*, 7464(V): 1-9 (2009).

Xu, C., et al., "Differential Phase-Shift Keying for High Spectral Efficiency Optical Transmissions," *IEEE Journal of Selected Topics in Quantum Electronics*, 10(2): 281-293 (2004).

Zhu, B., et al., "Transmission of 3.2 Tb/s (80×42.7 Gb/s) Over 5200 km of UltraWave™ Fiber with 100-km Dispersion-Managed Spans Using RZ-DPSK Format," in Proc. ECOC 2002, Postdeadline Paper PD4.2, (2002).

Yonenaga, K., et al.,"10-Gbit/s × Four-Channel WDM Transmission Experiment Over 2400-km DSF Using Optical DPSK Direct Detection Scheme," in Proc. OFC 97, 332-332. (1997).

Yonenaga, K., et al., "Reduction of four-wave mixing induced penalty in unequally spaced WDM transmission system by using optical DPSK," *Electronics Letters*, 32(23): 2118-2119 (1996).

Zhu, B., et al., "6.4 Tb/s (160×42.7 Gb/s) transmission with 0.8 bit/s/Hz spectral efficiency over 32×100 km of fiber using CSRZ-DPSK format." Paper PD19 presented at OFC Conference (2003). 3 pages.

\* cited by examiner

OPTICAL RECEIVER CONFIGURABLE TO ACCOMMODATE A VARIETY OF MODULATION FORMATS

RELATED APPLICATION

This application claims the benefit of U.S. Provisional Application No. 61/481,360, filed on May 2, 2011.

The entire teachings of the above application(s) are incorporated herein by reference.

GOVERNMENT SUPPORT

This invention was made with government support under FA821-05-C-002 awarded by the United States Air Force. The government has certain rights in the invention.

BACKGROUND OF THE INVENTION

The parallelization of optical communications using wavelength division multiplexing (WDM) has led to tremendous increases in fiber-optic channel capacity over the past decade. The use of numerous WDM channels to transmit information leverages the vast available spectrum of the optical channel (such as a guided, e.g., fiber-optic, or unguided, e.g., free space, optical channel) which exceeds many THz, with each channel preferably using a manageable amount of bandwidth (e.g., GHz-class) that may, in practice, be generated with available electronics.

Many applications of this technology require implementations that have small size, low weight, and low power consumption (SWAP). For example, space-based communications, especially those over the distances that exceed a typical Earth orbit, are usually power-starved, so simple low-SWAP receiver (RX) implementations with good sensitivity are desirable; improvements in RX sensitivity provide more link margin, extend link distances, and enable lower-power transmitters (TXs), an effect that lowers non-linear impairments and may provide benefit in both fiber-optic guided and free-space applications. The need exists for a wide-band parallel optical communication receiver, with good receiver sensitivity, reduced electrical bandwidth, simplified implementation, and lower size, weight, and power (SWAP).

SUMMARY OF THE INVENTION

In one embodiment, the present invention is an optical demodulator. The optical demodulator comprises an optical processor and a comparison module. The optical processor is configured to transform M parallel input optical signals into $2 \times \log_2 M$ intermediary optical signals. In example embodiments, the M parallel input optical signals represent input data encoded in an M-ary orthogonal modulation format, M being an integer greater than 2. The comparison module is optically connected to the optical processor and is configured to compare optical power of the intermediary optical signals to determine logical representation of the input data.

In another embodiment, the present invention is a method of optically demodulating input data. The method comprises transforming M parallel input optical signals into $2 \times \log_2 M$ intermediary optical signals. In example embodiments, the M parallel input optical signals represent input data encoded in an M-ary orthogonal modulation format, M being greater than 2; and comparing optical power of the intermediary optical signals to determine a logical representation of the input data.

Embodiments of the invention advantageously enable a variety of wide-band parallel optical communication receivers, with good receiver sensitivity, reduced electrical bandwidth, simplified implementation, and lower size, weight, and power (SWAP). Reconfigurable optical elements enable the receiver to accommodate a variety of modulation formats, such as M-ary frequency shift keying (M-FSK), wavelength division multiplexed (WDM)-based modulations including WDM M-ary pulse position modulation (M-PPM), on-off-keying (WDM-OOK), polarization shift keying (PolSK), polarization diversity, and hybrid formats (e.g., M-FSK/PPM) with improved performance and scalability to high data rates, and modulation bandwidths that may exceed 40 Gsym/sec with aggregate bandwidths that may occupy many THz of spectrum.

Example embodiments of the invention disclosed herein provide advantages over the conventional methods of demodulating data encoded in orthogonal modulation formats. Conventional M-FSK receivers use M separate detectors followed by M-to-1 winner-take-all analog comparison circuitry that picks the maximum signal (difficult to implement at high rates, e.g., more than a few GHz-class rates) or employ M analog-to digital converters (ADC), where the digital outputs are digitally compared to determine which received frequency signal is the largest. While conceptually straightforward, the ADC-based approach requires $M=2^k$ detectors and ADCs, where k is the number of bits per symbol, and high-speed ADCs are power-hungry and expensive, especially at high symbol bandwidths.

Due to the relationship between frequency (f) and wavelength ($\lambda$) for electro-magnetic waves, i.e., $c=\lambda f$, where c is the speed of light in vacuum, the frequencies that make up an M-FSK symbol set have a corresponding set of wavelengths. Consequently, the terms "frequency" and "wavelength" may be used interchangeably.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The orthogonal modulation formats are explained with reference to FIGS. 1A-1D. The term "orthogonal," as used herein with reference to a modulation format Refers to the property that any two symbols of an orthogonal symbol set, $s_i(t)$ and $s_j(t)$ have the following well known mathematical relationship $$\int s_i(t)s_j(t)dt = E_s \delta_{ij}$$

where $E_s$ is the energy per symbol and $\delta_{ij}$ is the Kronecher delta function:

$$\delta_{ij} = \begin{cases} 0, & \text{if } i \neq j \\ 1, & \text{if } i = j. \end{cases}$$

In other words, different symbols within an orthogonal symbol set have the same energy ($E_s$) but no joint energy, meaning filters may be employed to separate orthogonal symbols without any crosstalk.

Figure 1:
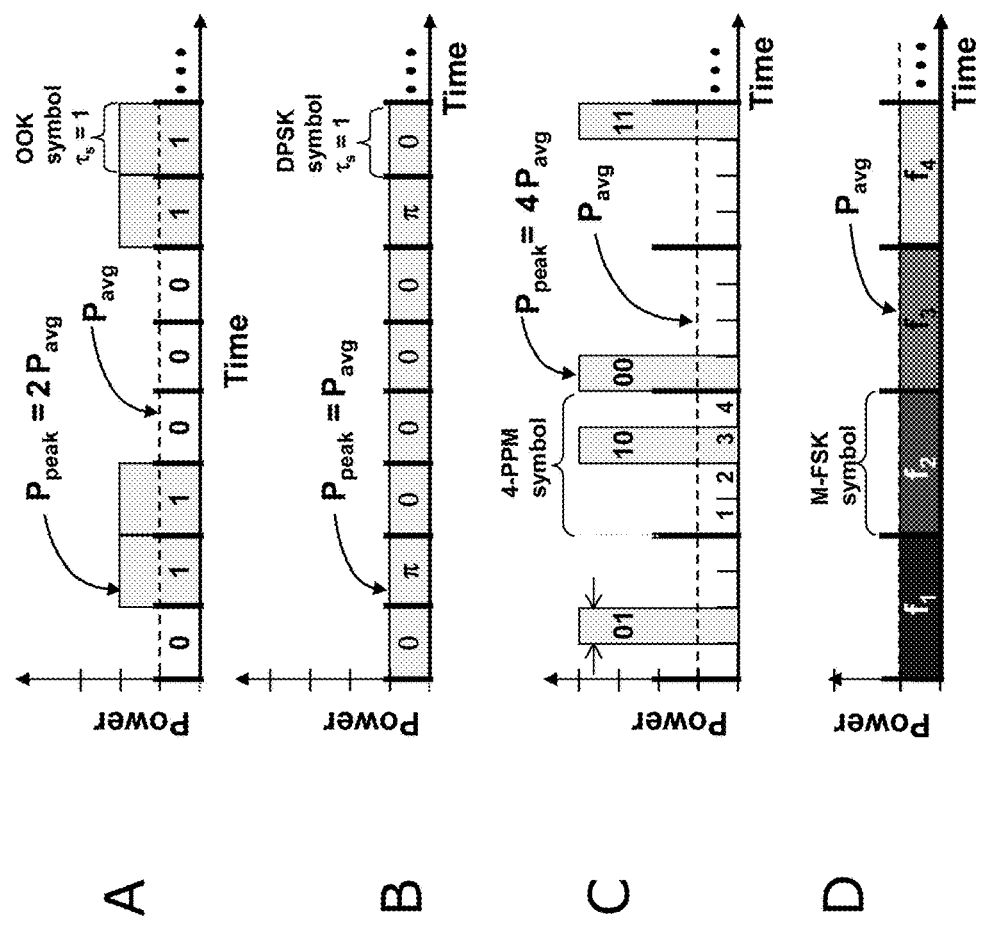
FIG. 1A is a power vs. time plot providing a schematic representation of the On-Off-Keying (OOK) modulation format.
FIG. 1B is a power vs. time plot providing a schematic representation of Phase-Shift Keying (PSK) modulation format.
FIG. 1C is a power vs. time plot providing a schematic representation of M-ary Pulse Position Modulation (M-PPM) format, where the symbol set size M=4.
FIG. 1D is a power vs. time plot providing a schematic representation of M-ary frequency-shift keying modulation (M-FSK) format, where the symbol set size M=4.

To better understand the benefits afforded by embodiments of this invention, it is instructive to understand the properties of commonly used modulation formats. FIG. 1A is a schematic representation of the On-Off-Keying (OK) modulation format imlementented with NRZ signaling. This is one of the simplest modulation formats, employing intensity modulation and a symbol set of two symbols (0 and 1) indicated by the presence or absence of optical power within the symbol to transmit encoded data. For an equal likelihood of 1s and 0s, OOK has a 50% duty cycle and the peak power is twice the average. As with all binary formats, OOK conveys $\log_2(2)$ or 1 bit per symbol. FIG. 1B is a schematic representation of Phase-Shift Keying (PSK) modulation format or Differentially encoded Phase-Shift Keying (DPSK). In phase modulation formats, data is encoded in phase or phase difference. FIG. 1B shows a binary PSK format, employing only two symbols (with phase 0 and π) or a binary DPSK format employing only two symbols (with 0 and π phase difference).

Figure 5:
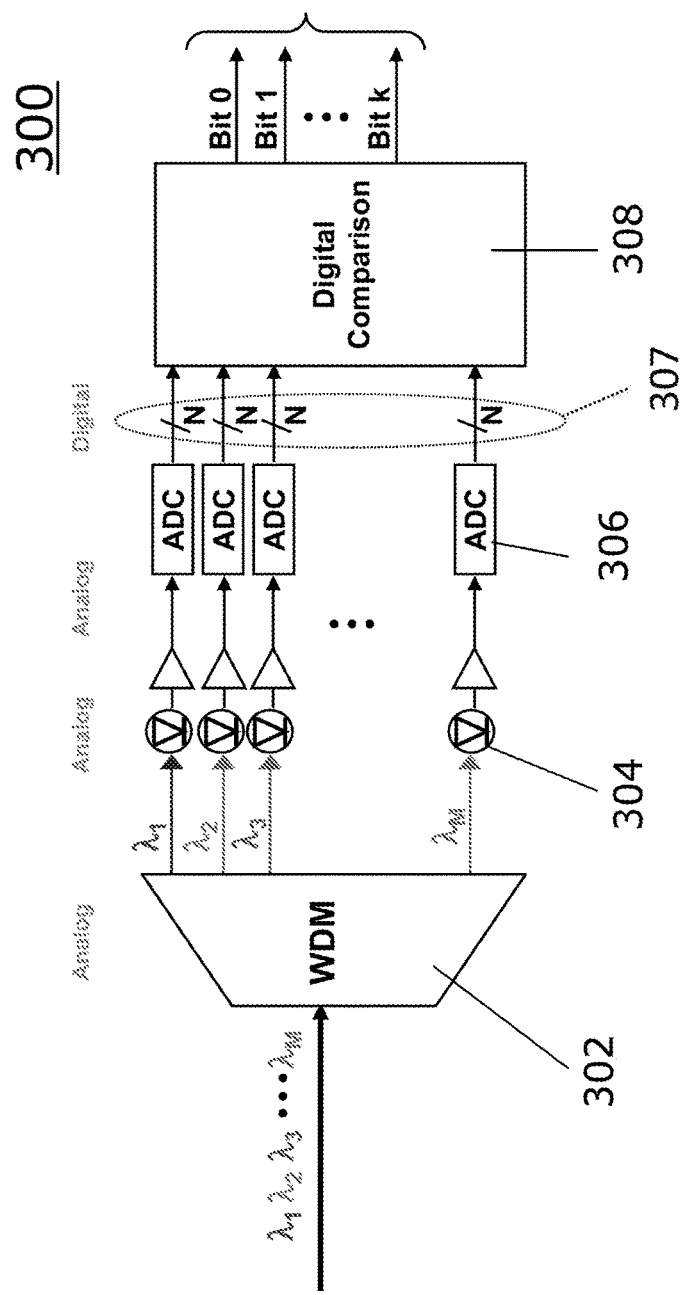
FIG. 5 is a schematic diagram of a conventional demodulator of data encoded by the above-described orthogonal modulation formats.

Additional example orthogonal modulation formats are M-ary Pulse Position Modulation (M-PPM, often considered for high-sensitivity applications), and M-ary Frequency Shift Keying (M-FSK). M-FSK has advantages over M-PPM because it has the same theoretical sensitivity benefit over binary formats but has lower peak power and electronic bandwidth (for a given M and data rate), compatibility with high-power semiconductor and Erbium-doped optical amplifiers. Further, M-FSK, unlike M-PPM, is well suited for use over long-haul fiber-optic links, where high-peak-power optical nonlinearities are often prohibitive. On the other hand, a drawback of M-FSK is the complexity of demodulation compared to M-PPM. M-PPM demodulators may be implemented with a single receiver and ADC, whereas conventional M-FSK demodulators, such as an example illustrated in FIG. 5, are implemented with M parallel receivers.

FIG. 1C is a schematic representation of M-ary (here, 4-ary) Pulse Position Modulation (M-PPM) format. In this format, data is encoded by the position of each pulse. In FIG. 1C, there are 4 symbols (corresponding to pulse positions) in a set. FIG. 1D is a schematic representation of M-ary (here, 4-ary) frequency-shift keying modulation (M-FSK) format. In this format, data is encoded by the frequency of each pulse. There are 4 symbols in a set, each symbol corresponding to one of selected frequencies (out of four, as shown in the example).

Common to all the FIGS. 1A-1D is the average power (equal to 1 unit) and the data rate, (e.g., bits/time).

Modulation bandwidth (BW) is the bandwidth needed to generate a symbol, e.g., how fast the signal needs to be turned on or off in OOK. Since typical modulation is usually driven by electronics, the modulation bandwidth generally analogous to the electrical bandwidth, and this may often pose a practical limit in high-speed wide band communication systems. Modulation bandwidth of an M-PPM method is given by $$BW=M/\log_2(M),$$

whereas modulation bandwidth of an M-FSK method is given by $$BW=1/\log_2(M).$$

Thus, for a given M, M-PPM requires M-times more modulation bandwidth than M-FSK, though they both may occupy the same net signaling (e.g. optical) bandwidth. In M-FSK, the net signaling bandwidth is increased directly in the frequency domain by the superposition of M spectrally distinct frequencies, whereas in M-PPM, the net signaling bandwidth increases in the time domain, with shorter pulses requiring fast modulation and wider bandwidth for each symbol. M-PPM and M-FSK formats are especially useful orthogonal modulation formats. These formats permit transmission of more information-per-symbol (bits/symbol), defined as $$k=\log_2(M),$$

where k is the number of bits per symbol. Furthermore, receiver sensitivity generally improves with information-per-symbol k. It should be noted that a modulation rate (electrical bandwidth) of the M-PPM method is given by M/k, while a modulation rate of an M-FSK method is given by 1/k. M-FSK method has an additional advantage over M-PPM in that it requires lower peak power.

It should be noted that for hybrid orthogonal modulation formats such as p-PPM/f-FSK/L-PoLSK, the equation above for the bits/symbol becomes $$k_{\it eff}=\log_2(M_{\it eff}),$$

where $M_{\it eff}=p \cdot f \cdot L$, where p is the number of PPM position, f is the number of FSK frequencies, and L is the number of polarizations (each ≥1) in the hybrid orthogonal symbol set.

Figure 2A:
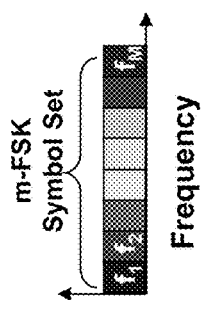
FIG. 2A is a schematic representation of an M-FSK symbol set of M=8 different symbols (frequencies).
Figure 2B:
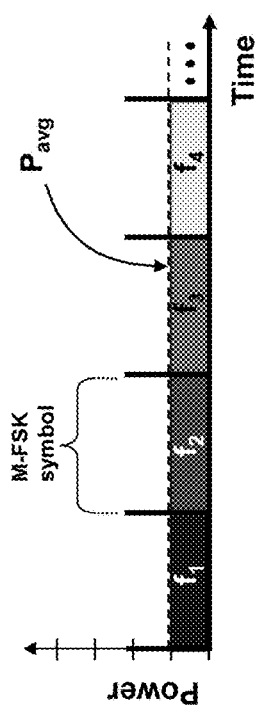
FIG. 2B is a schematic representation of a M-FSK waveform vs. time, showing four different symbols (frequencies) of the M-symbol set, each symbol being represented by a non-return-to-zero (NRZ) waveform.
Figure 2C:
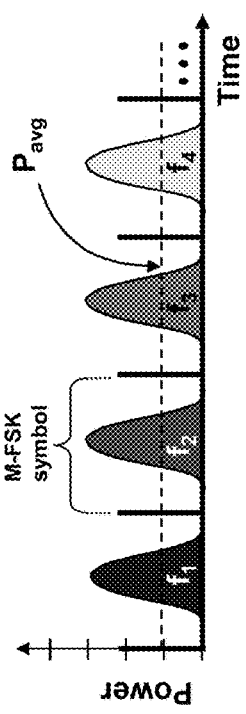
FIG. 2C is a schematic representation of a M-FSK waveform vs. time, showing four different symbols (frequencies) of the M-symbol set, each symbol being represented by return-to-zero (RZ) pulse which has a Gaussian shape.

FIG. 2A, FIG. 2B, and FIG. 2C further illustrate the M-FSK method of encoding. FIG. 2A is a schematic representation of an 8-FSK symbol set of 8 different symbols (frequencies). FIG. 2B is a schematic representation of a 4-FSK symbol set, having four different symbols (frequencies), each symbol being represented by an non-return-to-zero (NRZ) or square-shaped waveform, with 100% duty cycle the peak power equal to the average. Alternatively, FIG. 2C illustrates the M-FSK method of encoding with a Gaussian-shaped return-to-zero (RZ) waveform with approximately 33% duty cycle. In this case, the peak power is approximately three times the average.

Figure 3A:
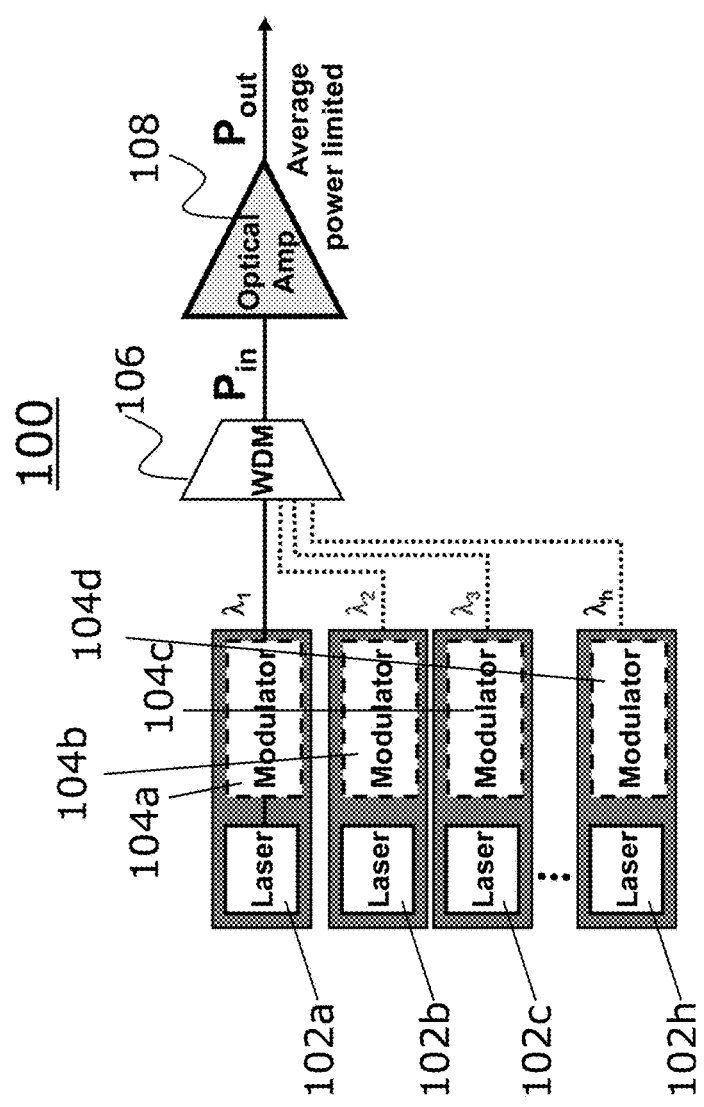
FIG. 3A is a schematic diagram of a parallel transmitter that may be used to transmit the data using a variety of modulation formats such as WDM-OOK, orthogonal modulations such as M-FSK, M-PPM, and PoLSK, and hybrid modulation formats.
Figure 3B:
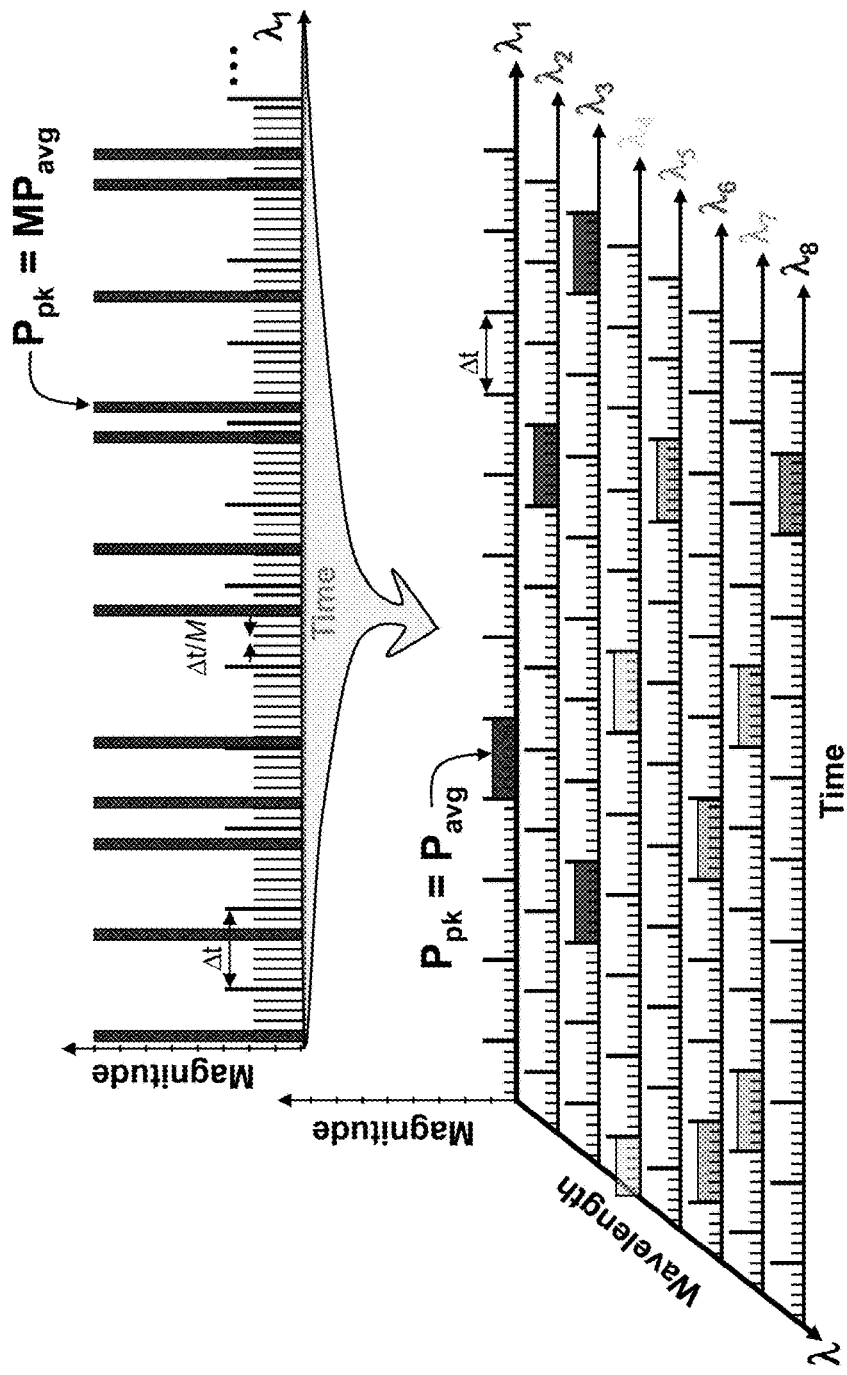
FIG. 3B is a superposition of two power vs. time plots providing schematic representations of 8-ary PPM and 8-ary FSK modulation waveforms, where the different frequencies (wavelengths) are indicated by where i={1, 2, . . . 8}.
Figure 4:
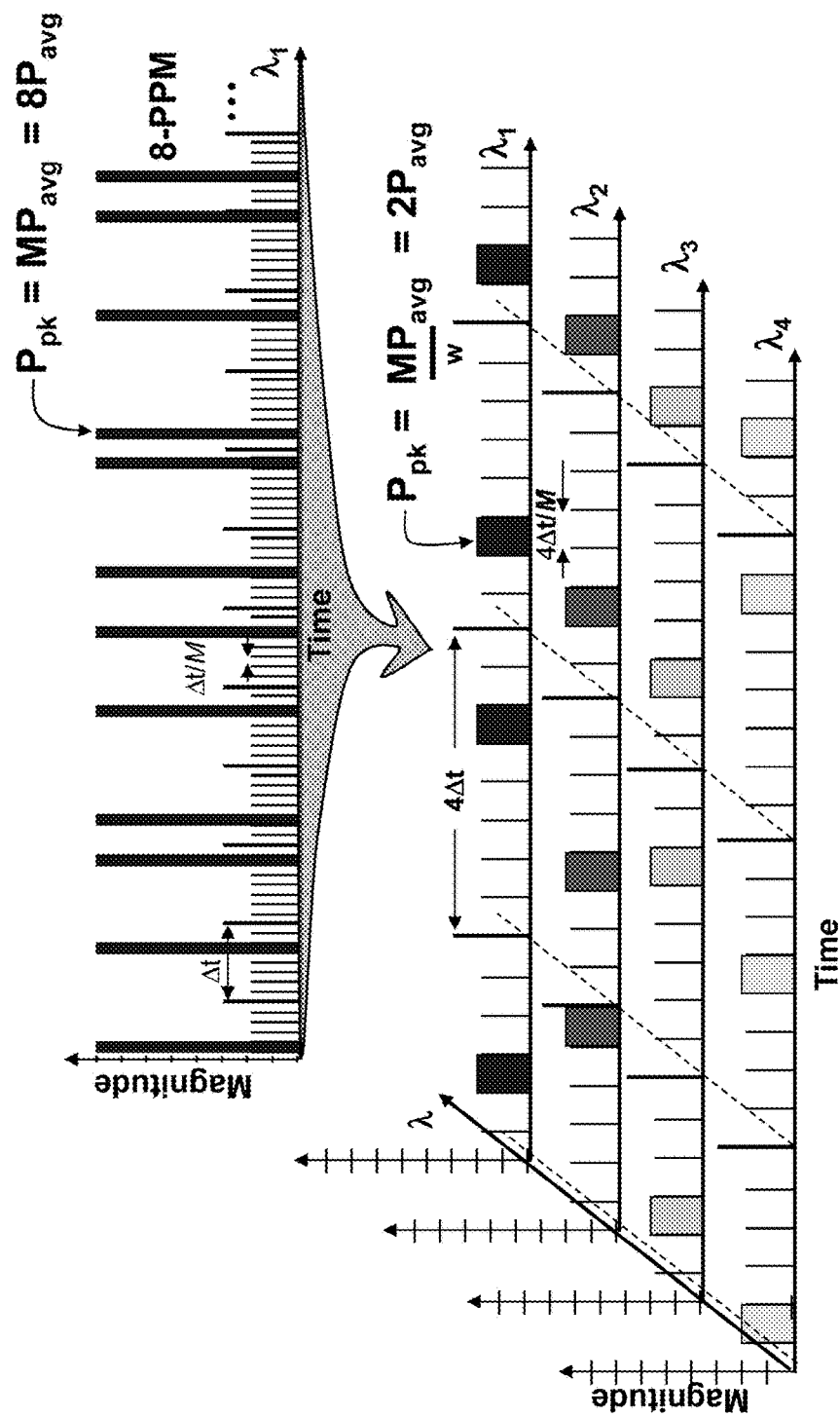
FIG. 4 is a superposition of two power vs. time plots providing schematic representations of 8-ary PPM, and 8-ary PPM wavelength-multiplexed over four wavelengths (4-WDM/8-PPM).

FIG. 3A illustrates a flexible h-channel parallel transmitter 100. It is a schematic diagram of a parallel transmitter that may be used to transmit the data modulated by a variety of modulation methods. Here, h laser sources 102a through 102h generate optical signals, modulated by modulators 104a through 104h. The signals are then combined by a wavelength division multiplexing module 106, and amplified by an amplifier 108. This transmitter, for example, may generate h-WDM signals in which each of the modulators imparts independent data onto wavelengths a-h. In this case, each modulator could, for example, impart OOK or M-PPM as shown in FIG. 4. Alternatively, the h-modulators may impart data that is dependent, and generate, for example, h-ary FSK modulation, in which only one wavelength is transmitted within a given symbol time as shown in FIG. 3B, for the case of h=8. As may be seen, the data comprises eight optical signals, each signal carrying orthogonal symbols encoded by the presence, during a certain time frame, of a signal of certain frequency. The equivalent M-PPM format for the case of M=8 is shown in FIG. 3B, with the same average power, net data rate, and theoretical sensitivity, but with 8 times the peak power and $\frac{1}{8}^{th}$ the signal duration, thus requiring 8 times the modulation bandwidth and 8 times the electrical bandwidth in both the TX and RX electronics.

FIG. 4 illustrates another example of the how the modulation may be adapted, in this case without changing the average power, the information per symbol, or the sensitivity. Here, the M-PPM format (again using an example of M=8) is reconfigured, so that the data is conveyed by four-fold wavelength division multiplexing (4-WDM/8-PPM), which reduces the peak power and required modulation by a factor of 4 (the number of wavelengths), at the cost of the 4× increase in parallelization in the TX and RX. This signal may be wavelength multiplexed using, for example, a transmitter similar to transmitter 100 shown in FIG. 3A. As may be seen, the received signal (carrying the data) comprises four optical signals, each signal carrying orthogonal 8-ary PPM symbols encoded by the presence of a signal at a certain position within any given time frame.

In addition to time-domain position and frequency, other properties of optical signals (generically electro-magnetic signals) such as polarization may be traded to achieve the desired aggregate characteristics, such as sensitivity, modulation and electrical bandwidth, peak power, etc., as is known in the art. For example, a second orthogonal polarization may be added to the orthogonal symbol constellation in exchange for reducing the number of PPM positions by a factor of two. This would reduce the peak power and the modulation bandwidth by a factor of two, without impacting the bits per symbol or the data rate. A similar effect may be achieved by doubling the number of orthogonal FSK frequencies in exchange for halving the number of PPM positions in the symbol constellation.

A conventional demodulator 300 of data encoded by the above-described orthogonal modulation formats is illustrated with reference to FIG. 5. The wavelength division multiplexed data is separated into M optical input signals by a wavelength division multiplexing (WDM) module 302. Each one of the M optical input signals is converted into a corresponding electric input signal by diodes 304. The electrical input signals are then converted into digital signals 307 by analog-to-digital converters (ADCs) 306, and the resulting digital signals 307 are compared by a comparator 308, thus permitting setting the bits encoded in the received data.

Optical Processor of the Present Invention

Example embodiments of the present invention include an optical processor configured to demodulate data encoded by an orthogonal modulation format. As used herein, the term "optical processor" means that the processor that converts its input optical signal into its output optical signal without any digital processing of the optical signal or an electrical signal into which the optical signal is converted.

Figure 6A:
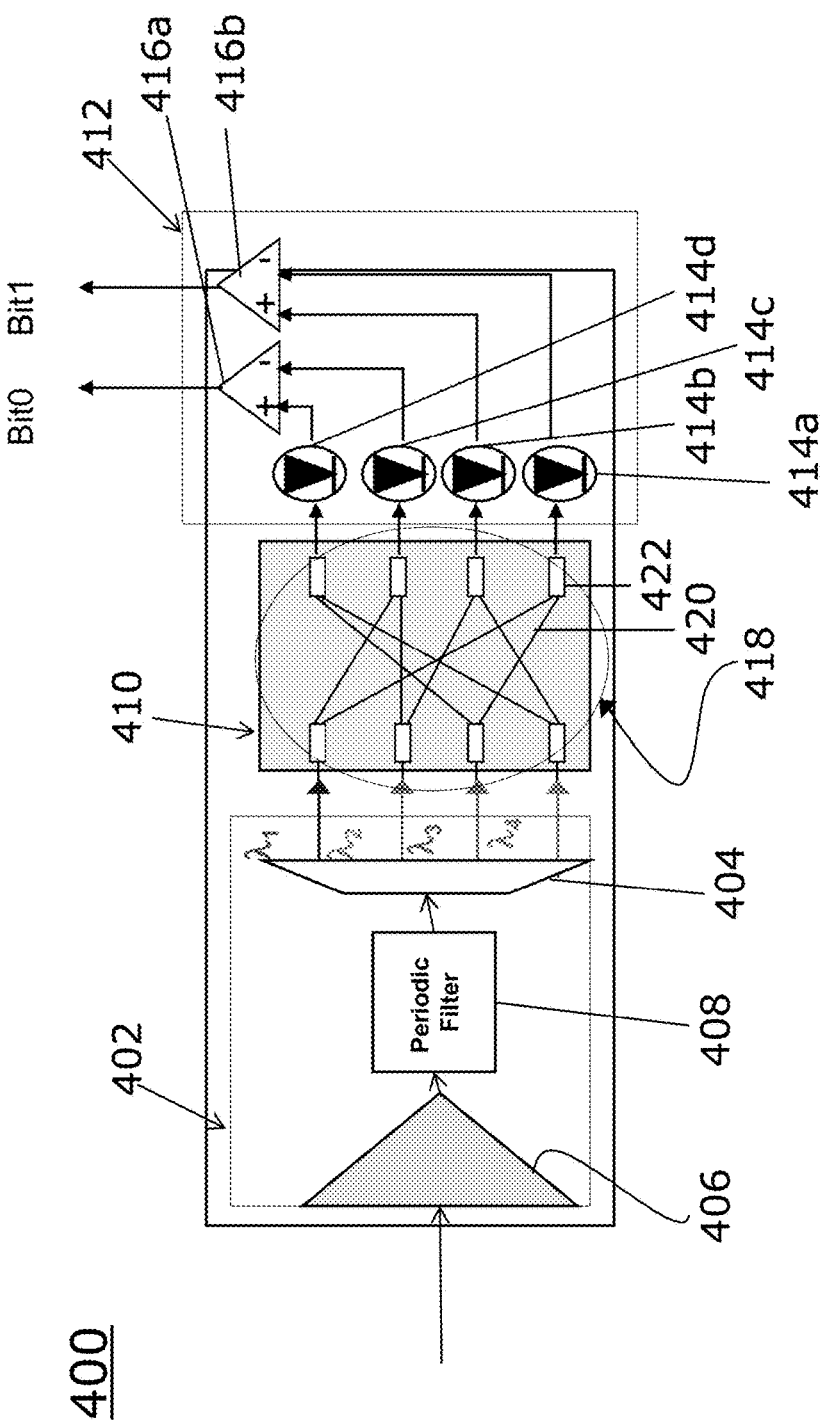
FIG. 6A is a schematic diagram of an example embodiment of an optical demodulator of the present invention suitable for demodulating data encoded in a 4-ary FSK format.
Figure 6B:
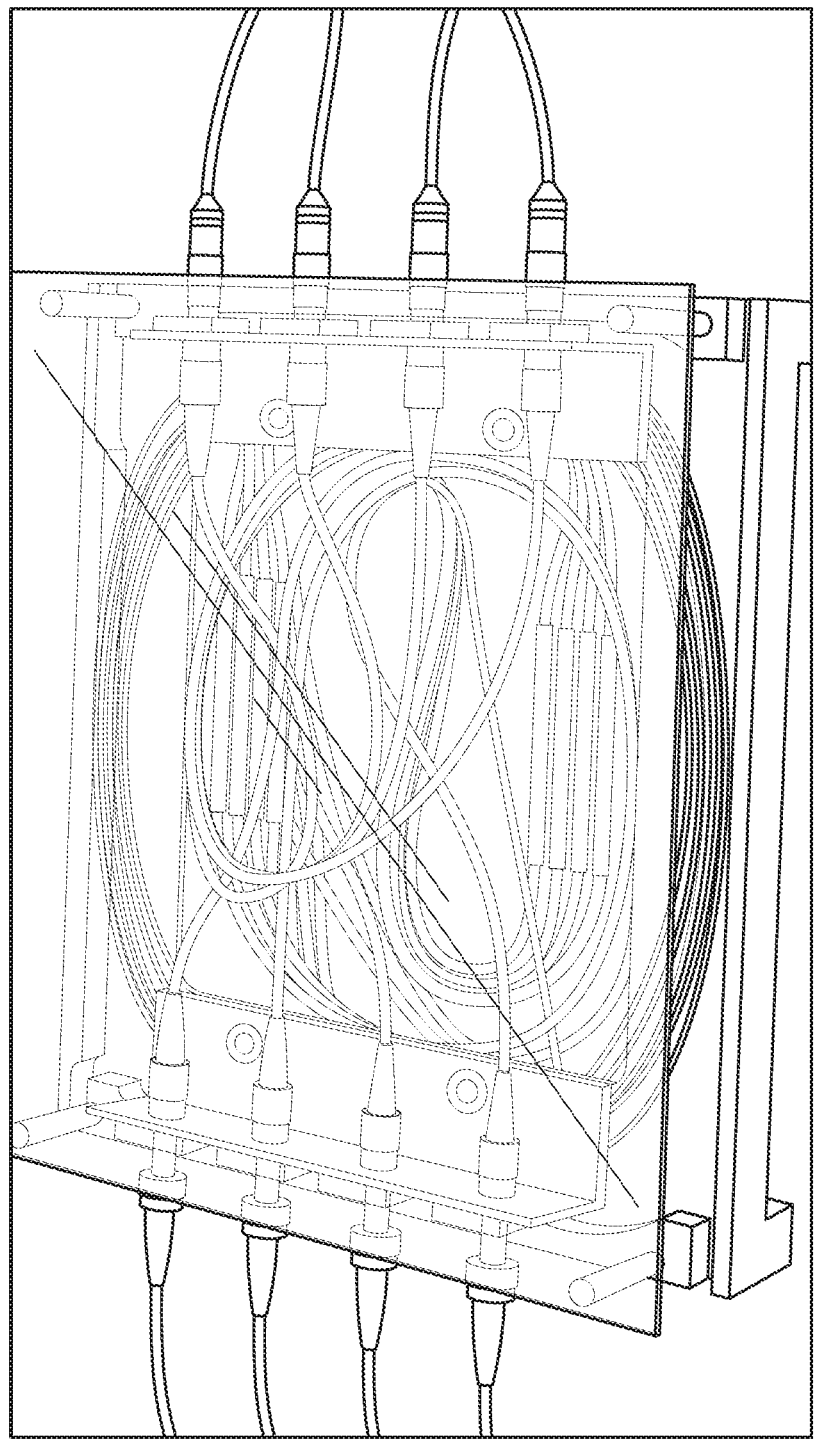
FIG. 6B is a line drawing of an example embodiment shown in FIG. 6A.

An example embodiment of the present invention is illustrated in FIG. 6A and is further shown in FIG. 6B, which is a line drawing of an example embodiment shown in FIG. 6A. Referring to FIG. 6A, an optical demodulator 400 is shown. The optical demodulator 400 includes an optical processor 410, with inputs 409 and outputs 425, and a comparison module 412. The optical demodulator 400 may optionally include a preprocessor 402, with outputs 409. The preprocessor 402 may include a processing elements 404 configured to separate the data into M optical signals. In an example embodiment, processing element 404 may be a wavelength division multiplexing (WDM) module configured to separate the data into M optical signals, with each signal being a distinct wavelength (or frequency). The processing element 404 may include a plurality of WDMs, temporal switches, polarization splitters, and VOAs so that the M optical signals 409 that may be reconfigured to represent different orthogonal bases, (e.g, frequency, polarization, position, or some combination thereof). The preprocessor 402 may further include an amplifier 406 and periodic filter 408 or a polarization filter/splitter 407. The periodic filter 404 may be matched to the optical waveform of the symbols of the orthogonal modulation format.

Figure 6C:
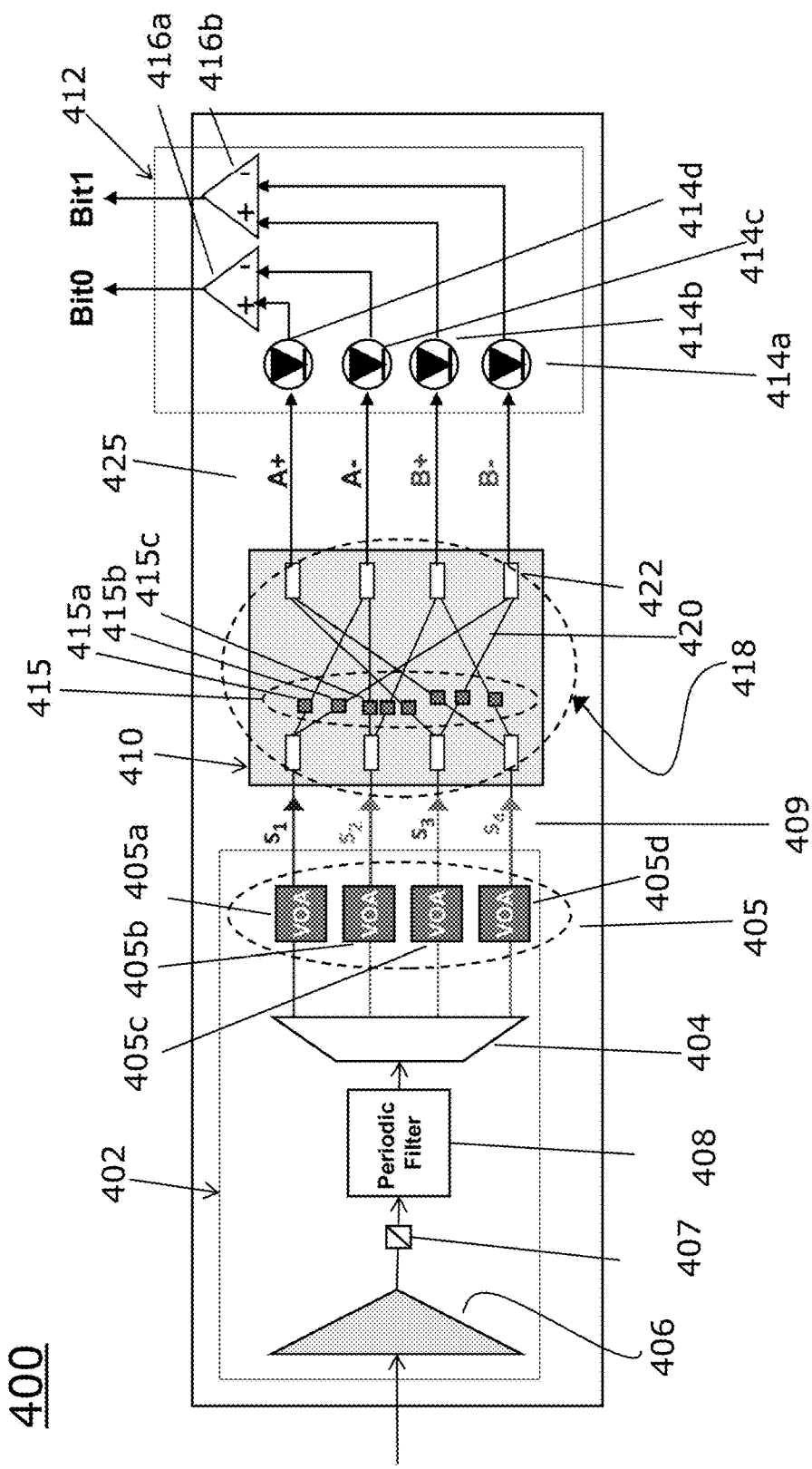
FIG. 6C is a schematic diagram of an example embodiment of an optical demodulator of the present invention suitable for demodulating data encoded in a 4-ary FSK format that employs variable optical attenuators.

A further example embodiment of parallel receiver 400 is shown in FIG. 6C. In this example embodiment, preprocessor 402 may further include optional variable optical attenuators (VOAs) 405 that may be used to select or balance the preprocessor outputs 409 $s_1$, $s_2$, $s_4$ in this example prior to the optical processor 410. The VOAs 405, with individual elements 405a, 405b, ... 405d may serve to compensate for biases in other elements of the preprocessor 402 or the processor 410 to optimize performance (e.g., by correcting for insertion loss variations in WDM outputs), or configure the operation of the preprocessor though selection of the preprocessor outputs 409 that pass though to the optical processor 410. Similarly, VOAs 415 may be included in the optical processor 410 to compensate for biases in the split ratios (e.g., biases that may be due to manufacturing errors or tolerances, or wavelength or polarization dependent losses).

Referring to FIG. 6C, the optical processor 410 may be configured to transform M parallel input optical signals into $2 \times \log_2 M$ intermediary optical signals 425. The M input optical signals can, in example embodiments, represent input data encoded in an M-ary orthogonal modulation format. In example embodiments, M is greater than 2. The intermediary optical signals 425 are weighted superposition of optical input signal powers 409. The weighting is determined by the fixed optical coupling elements 422 and the reconfigurable VOAs 415. In an example embodiment, the intermediary optical signals 425 are:

$$A+ = w1 \cdot s3 + w2 \cdot s4$$

$$A- = w3 \cdot s1 + w4 \cdot s2$$

$$B+ = w5 \cdot s2 + w6 \cdot s4$$

$$B- = w7 \cdot s1 + w8 \cdot s3,$$

where the weighting factors w1-w8 may be reconfigured by adjusting the transmission of VOAs 415.

Referring again to FIG. 6A and FIG. 6C, the comparison module 412 is optically connected to the optical processor 410. The comparison module 412 is configured to compare optical power of the intermediary optical signals 425 (shown in FIG. 6C), which are output by the optical processor 410 and presented to the comparison module 412, to determine a logical representation of the input data.

As explained above, the logical representation of the input data includes a set of k bits, k being equal to $\log_2 M$. In an example embodiment, the k logical bits are determined by comparing the power of intermediary optical signals A+ to A− and B+ to B− as shown in FIG. 6C. In this case, $$Bit0 = A+ < > A-$$

$$Bit1 = B+ < > B-$$

where < > represents the comparison (less than or greater than): if A+ is less than A−, the Bit0 is a logical 1 and if A+ is greater than A−, Bit0 is a 1, and so forth. For the example embodiment where the output of preprocessor 409 represents M-ary orthogonal symbols (e.g., 4-FSK symbols), Bit0 and Bit1 are the logical representation of this M-ary input data. In this case, M=4, with 2 bits of logical data. In general, this approach scales to larger M, which will be shown in FIG. 7A and FIG. 8.

Referring again to FIG. 6C, the weighting factors imparted by VOAs 415 are reconfigured to enable the demodulator to demodulate other modulation formats. For example, by making weighing elements w1=1 and w2, w3, w4=0; and w6=1 and w5, w7, w8=0; Bit 0 represents the OOK demodulation of symbol s3 and Bit 1 represents the OOK demodulation of symbol s4. By making weighing elements w2, w4=1 and w1, w3=0; and w6=1 and w5, w7, w8=0; Bit 0 represents the 2-orthogonal (e.g, 2-FSK) demodulation of symbols s4 and s2. Thus, adjustment of VOA transmission and the corresponding weighting functions enables the demodulator to reconfigure so that it may demodulate other modulation formats, thereby increasing flexibility.

Referring now to FIG. 6A, comparison module 412 includes optical detectors 414a through 414d, converting intermediary optical signal into intermediary electrical signals, and is configured to perform k binary comparisons of optical powers of the intermediary optical signals using comparators 416a and 416b.

Referring again to FIG. 6A, optical processor 410 includes an optical distribution matrix 418 configured to, in this example embodiment, to pairwise add the M parallel input optical signals. Generally, the addition of the optical signals may be achieved by combining the powers of the signal in two at time (e.g., pairwise), three at a time, and in general N at a time, where N is positive integer. The optical distribution matrix 418 comprises at least M waveguides 420 and at least M optical couplers 422. The optical couplers 422 may be single mode couplers or multi-mode N×1 couplers that may efficiently combine N single-mode inputs into 1 multimode output. When used in the last column of the optical distribution matrix 418 prior to the optical detectors 414 and the optical detectors are configured to efficiently accept such multimode inputs, this may provide reduced insertion loss through the distribution matrix 418 with little or no performance penalty. For example, 50/50 single mode couplers have a minimum of 3 dB insertion loss, whereas a 2×1 single-mode to multimode coupler/combiner may have near zero insertion loss.

In the example embodiment shown schematically in FIG. 6A (and graphically in FIG. 6B), the 4-ary FSK format is used, and optical distribution matrix 418 is configured to pairwise add the M input optical signals to produce the $2 \times \log_2 M$ intermediary optical signals. In this example with the optical distribution matrix 418 configured with 4 inputs and 4 outputs, it may also be referred to as a quad or a quad demodulator block. With a proper optical preprocessor 402, which separates M-ary orthogonal optical symbols prior to the distribution matrix 415, this method may be used to demodulate the orthogonal symbol and determine the k-bits with k pairwise comparisions. For the example of M-FSK, the preprosessor may be implemented with a WDM, which separates the orthogonal frequencies. For M-PPM, the preprocess may be implemented with a circulating 1×M optical switch, which separates the orthogonal positions and delays them so that they are time-aligned at the input of the distribution matrix. As will be explained below, it is possible to configure the optical distribution matrix 418 for M greater than 4, in which case the optical distribution matrix 418 will be configured to pairwise add the M input optical signals to produce auxiliary optical signals and to further pairwise add the auxiliary optical signals to produce $2 \times \log_2 M$ comparable signals (see FIGS. 7A and 7B).

Figure 7A:
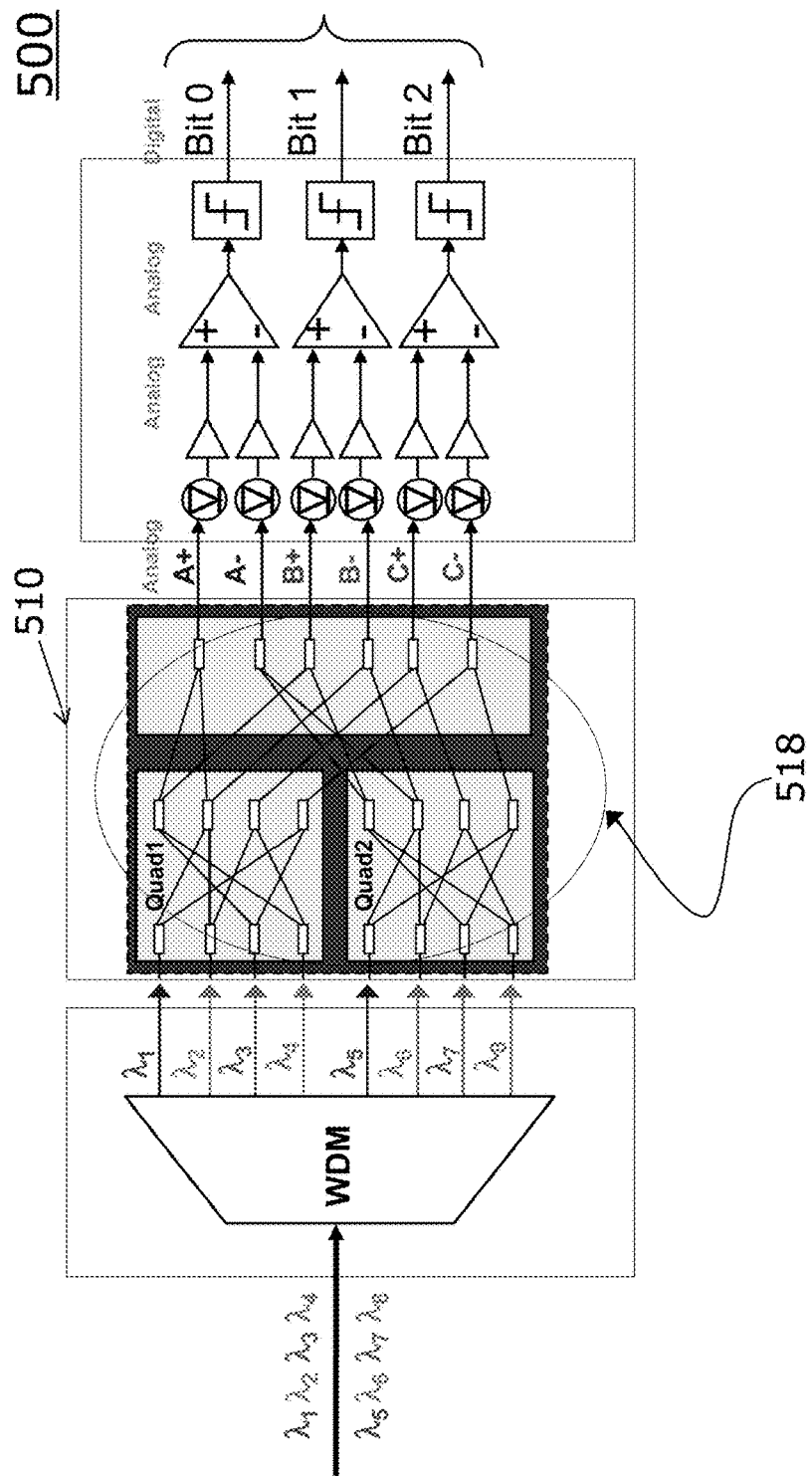
FIG. 7A is a schematic diagram of an example embodiment of an optical demodulator of the present invention suitable for demodulating data encoded in a 8-ary FSK format.
Figure 7B:
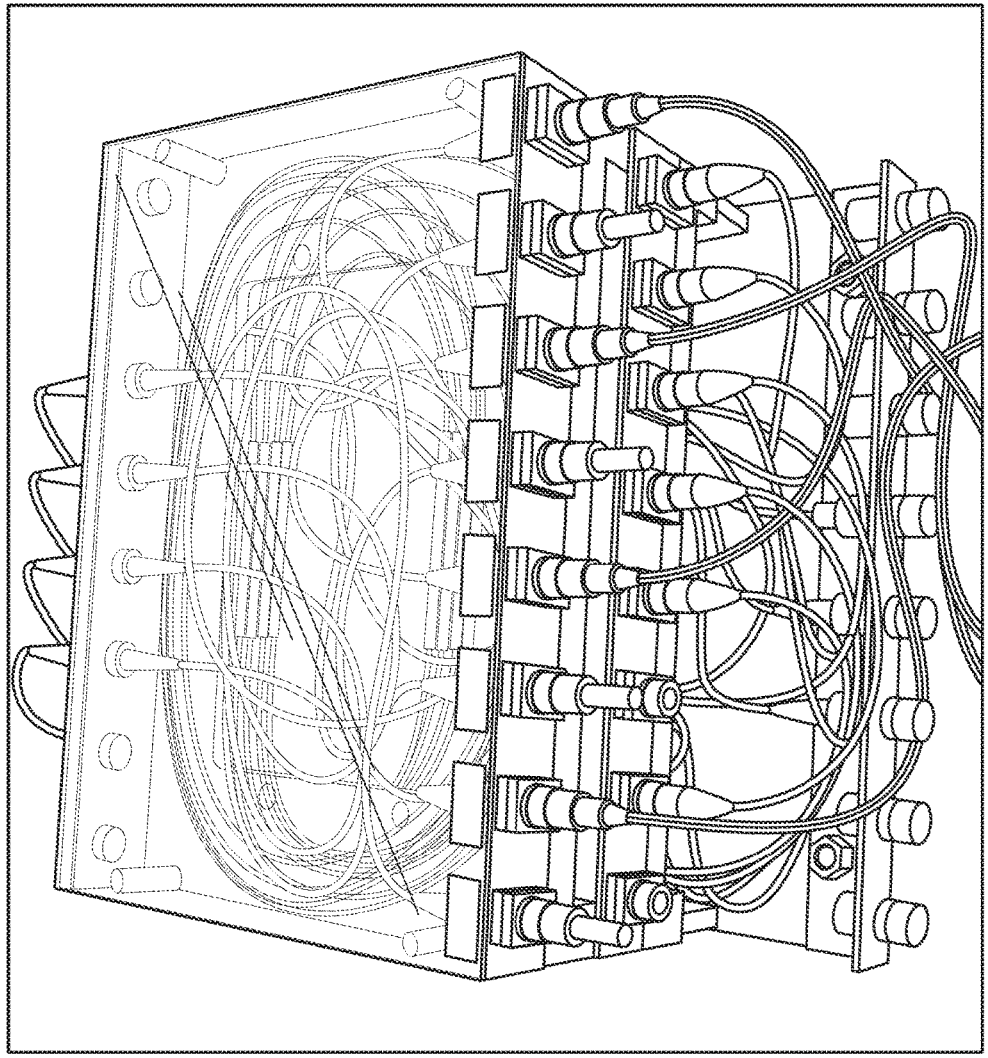
FIG. 7B is a line drawing of an example embodiment shown in FIG. 7A.

Another example embodiment of the present invention is illustrated schematically in FIG. 7A and is further shown in FIG. 7B, which is a line drawing of the example embodiment shown in FIG. 7A. The embodiment shown in FIG. 7A is an optical demodulator 500 is configured to perform demodulation of data encoded in 8-FSK format. An optical processor 510 of the optical demodulator 500 comprises an optical distribution matrix 518 configured to pairwise add the M input optical signals to produce auxiliary optical signals and further to pairwise add the auxiliary optical signals to produce $2 \times \log_2 M$ comparable signals.

Figure 8:
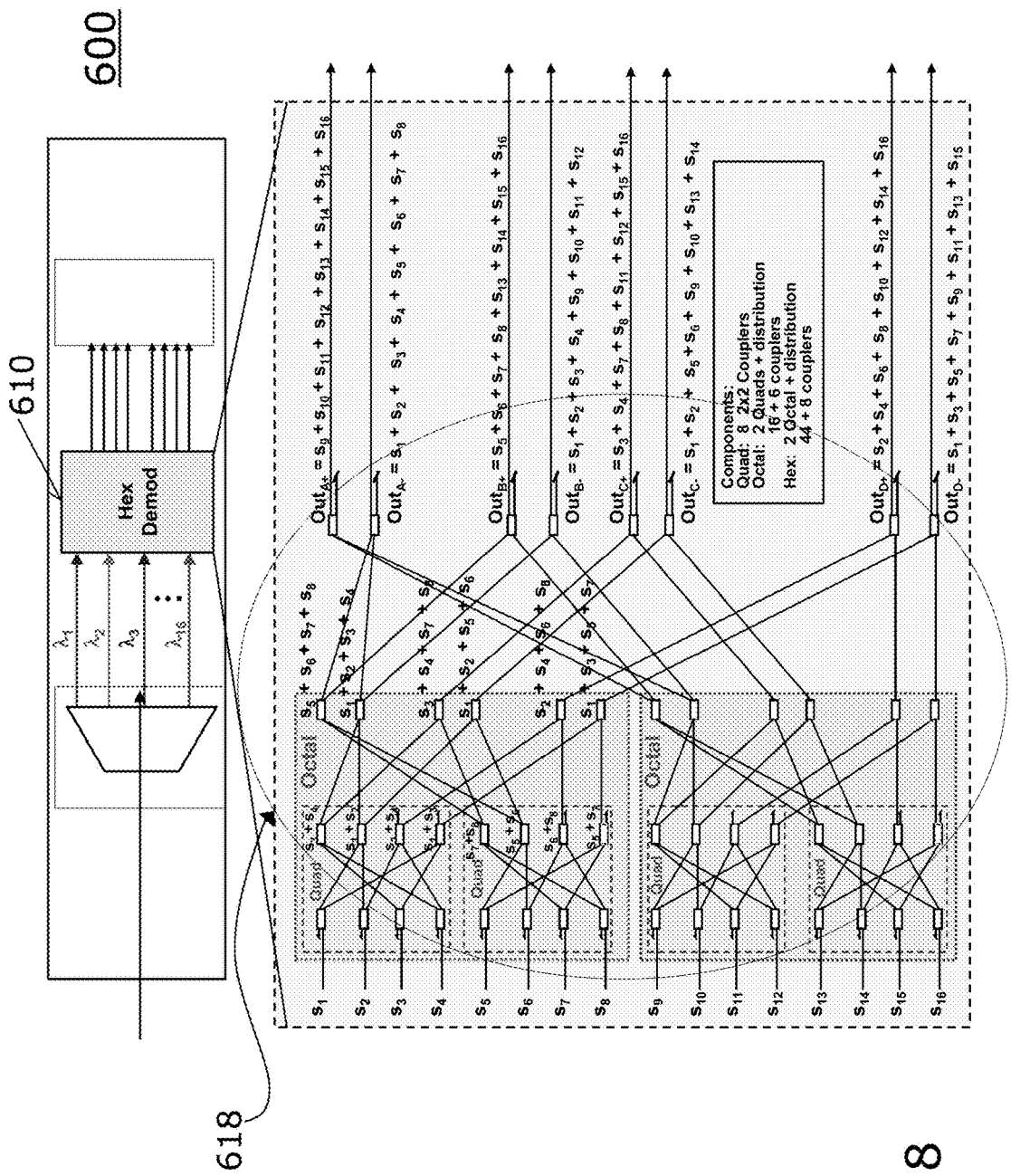
FIG. 8 is a schematic diagram of an example embodiment of an optical demodulator of the present invention suitable for demodulating data encoded in a 16-ary FSK format.

Another example embodiment of the present invention is illustrated in FIG. 8. In this example, an optical demodulator 600 is configured to perform demodulation of data encoded in 16-FSK format. An optical processor 610 of the optical demodulator 600 comprises an optical distribution matrix 618 configured to pairwise add the M input optical signals to produce auxiliary optical signals and further to pairwise add the auxiliary optical signals to produce $2 \times \log_2 M$ comparable signals. Although not shown in FIG. 8, the optical demodulator 600 further includes a comparison module configured to perform eighth binary comparisons of optical powers of the intermediary optical signals and to set four bits encoded by the 16-FSK modulated input data. As in the case of the 4-ary distribution matrix 418, the insertion loss and component count in 16-ary distribution matrix 618 may be reduced by substituting multi-mode N×1 couplers that may efficiently combine N single-mode inputs into 1 multimode output. When used in the last columns of the optical distribution matrix 618 prior to the optical detectors, and the optical detectors are configured to efficiently accept such multimode inputs, this may provide reduced insertion loss of up to 3 dB per 50/50 single-mode coupler replaced. For example, if the optical combining of the last two columns of couplers were implemented with 4×1 single-mode to multimode combiners, the loss through the distribution matrix 618 may be reduced by as much as 6 dB and the coupler count reduced by as much as 12 couplers.

Figure 9A:
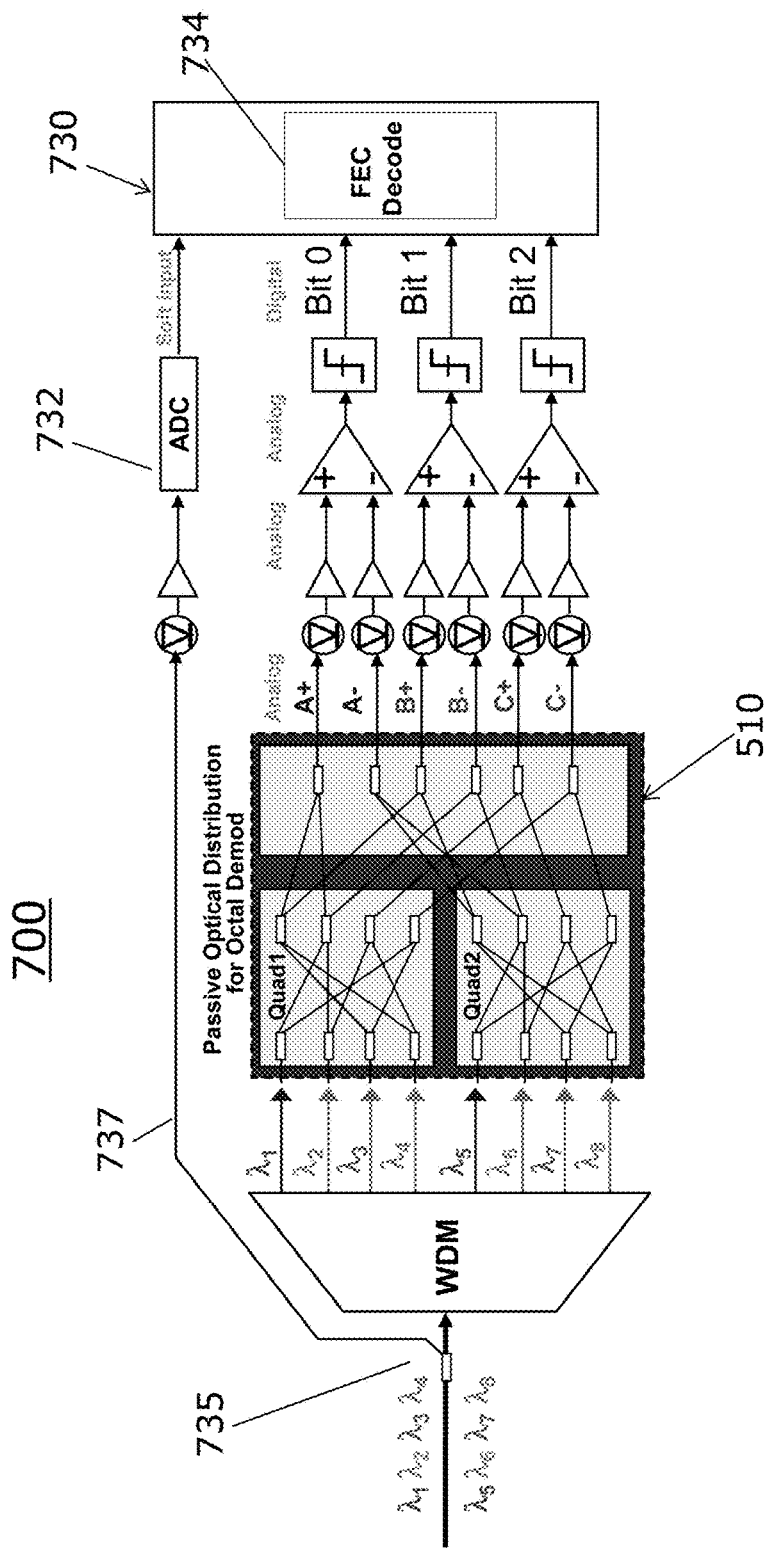
FIG. 9A is a schematic diagram of an example embodiment of an optical demodulator of the present invention suitable for demodulating data encoded in a 8-ary FSK format and hybrid formats such as 8-ary FSK/M-PPM, and providing soft-information for use in decoding.
Figure 9B:
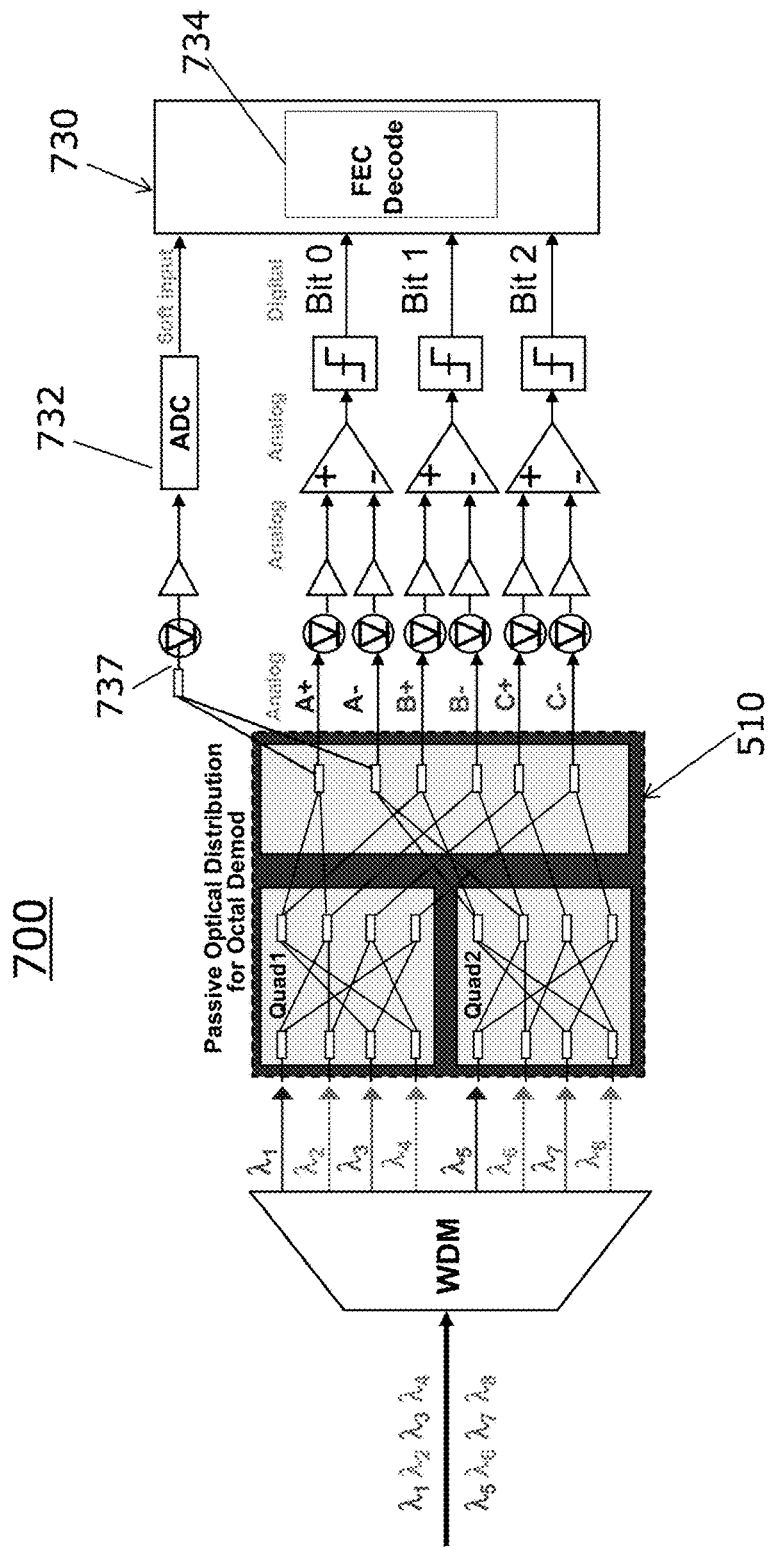
FIG. 9B is a schematic diagram of an another example embodiment of an optical demodulator of the present invention suitable for demodulating data encoded in a 8-ary FSK format and hybrid formats such as 8-ary FSK/M-PPM, and providing soft-information for use in decoding, wherein the soft information is obtained from alternative locations.

In example embodiments, any of the optical demodulators described above may further include a level estimator employing an Analog-to-Digital Converter (ADC). FIG. 9A is a schematic diagram of such an example embodiment, here, an 8-FSK optical demodulator 700. The optical demodulator 700 includes a level estimator 730 that employs an ADC 732. The input signal 737 to the ADC 732 is obtained from a portion of the input signal from an optical splitter 735 prior to optical preprocessing. The level estimator 730 may be configured to determine a confidence level of logical representations of the input data. In further example embodiments, the optical demodulator 700 may include a forward error correction module 734 to correct the logical representation of the input data as a function of the confidence level. FIG. 9B is a schematic diagram of a similar embodiment, illustrating that an equivalent input 737 to the level estimator 730 may be obtained from other locations within the demodulator 700. In this example, the input 737 is obtained by adding the power from couplers providing the A+ and A− inputs to the comparison module. Alternatively, the input signal may be derived from the B+ and B−, or C+ and C− inputs to the comparison module, since the addition of comparison inputs is largely equivalent to the power incident to the optical preprocessor.

The level estimator may also be configured in an example embodiment to enable hybrid M-ary orthogonal demodulation of f-FSK/p-PPM symbols, where M=f·p. In this case, the optical processor 510 may determine the FSK portion of each orthogonal symbol (e.g, determine which frequency was the largest) and the level estimator may determine the PPM portion of each orthogonal symbol (e.g., determine which time-position was the largest). The hybrid M-ary orthogonal symbols may be envisioned as a two dimensional symbol constellation, with f-frequencies on one axis, and p-positions on the other axis, with a total of f·p symbols and $\log_2(f \cdot p)$ bits per symbol. For example, hybrid 8-FSK/4-PPM is equivalent to 32-ary orthogonal and conveys 5-bits/symbol, with peak power only four times greater than the average and a modulation/electronic bandwidth 20% less than data rate.

Figure 10:
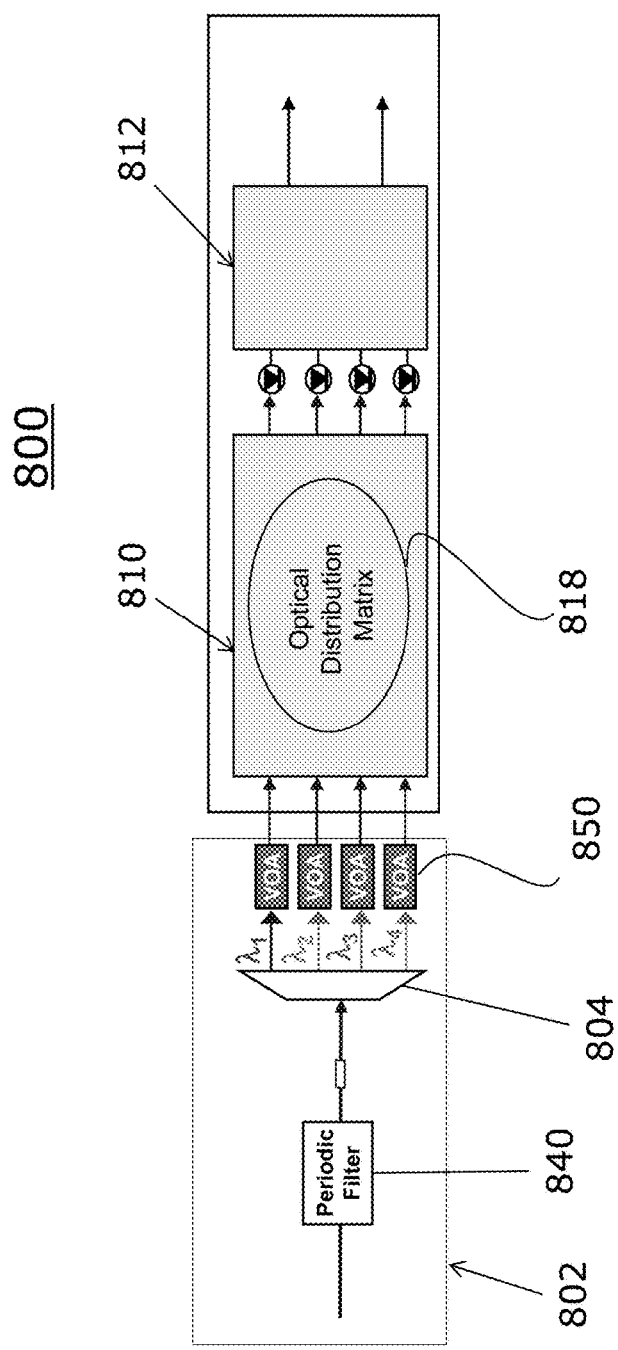
FIG. 10 is a schematic diagram of an example embodiment of an optical demodulator of the present invention suitable for demodulating data encoded in a 4-ary FSK format.

In example embodiments, any of the optical demodulators described above may further include a periodic filter matched to the optical waveform of the symbols of the orthogonal modulation format. In other example embodiments, any of the optical demodulators described above may further include at least one variable optical attenuator configured to control pairwise adding of at least two input optical signals. Both such example embodiments are illustrated in FIG. 10, which is a schematic diagram of a 4-FSK optical demodulator 800, but generally scales to the M-ary orthogonal embodiments described herein. In FIG. 10, an optical demodulator 800 includes a processor 810 and a comparison module 812. The optical processor 810 includes an optical distribution matrix 818. A preprocessor 802 may be comprised of an orthogonal preprocessing filter, such as a wavelength division multiplexing (WDM) module 804 and periodic filter 840, that filters and separates the orthogonal symbols. In the example embodiment shown in FIG. 10, each input signal may further be controlled by a variable optical attenuator 850. In an example embodiment, the present invention is an optical transceiver comprising any of the optical demodulators described above, configured to demodulate data encoded in an M-ary orthogonal modulation format, and further including a parallel transmitter configured to transmit data encoded in an M-ary orthogonal modulation format.

In example embodiments, the M-ary modulation format may include an M-ary frequency shift keying (M-FSK) format. In other example embodiments, the M-ary modulation format may include an M-ary pulse-position modulation (M-PPM) format. In further example embodiments, the M-ary modulation format may be a 2-dimensional hybrid f-FSK/p-PPM format or 3-dimensional f-FSK/p-PPM/L-PSK format. Here, f, p, and L are each positive integer number of orthogonal FSK frequencies, PPM positions, and PolSK polarizations, respectively.

Advantages of the Example Embodiments of the Present Invention

The example embodiments of the present invention provide a straightforward means of demodulating M-FSK optical signals with good sensitivity. These devices and methods disclosed herein may be generalized for M-PPM as well as other hybrid M-orthogonal modulation methods such as those described above. The f-FSK receiver determines which of the f received signal frequencies has the largest energy. Once this determination is made, each demodulated f-FSK symbol generates k bits, where $k_f=\log_2 f$. As described herein, f-FSK demodulation may be accomplished with an optical front end comprising simple optical elements, such as optical amplifiers, wavelength division multiplexing (WDM) modules, optical splitters, and variable optical attenuators (VOAs). The elements of the devices described herein may be configured for hard decision decoding (e.g., only digital 0 or 1 logical data is used to perform forward error correction function), with the k-bit M-FSK symbol determined from only k binary comparisons. Graded (non-digital) soft decision information, that is useful for forward error correction (FEC) of the received data, may be attained by the detection and measurement of a single optical output channel containing all M-FSK signals (of which only one of the signals is "on"). The measurement may be achieved via a high-speed photodetector and analog-to-digital converter (ADC). In this case, the k-binary comparisons indicate signal of which frequency has the largest amplitude, and the ADC output indicates the magnitude of that signal. Furthermore, the ADC may also enable the detection of hybrid time-frequency M-ary orthogonal signals, by providing level estimates that may be used to determine which time-position was the largest.

This is in sharp contrast to conventional M-FSK receivers, which may use M separate detectors followed by M-to-1 winner-take-all analog comparison circuitry (which is difficult to implement at GHz rates) or M-ADCs, where the digital outputs are digitally compared to determine which received signal has the largest amplitude. While conceptually straightforward, the ADC-based approach requires M=2k detectors and ADCs, and high-speed ADCs are power hungry and expensive, and until recently, unavailable at rates of greater than 3 GHz. For 16-FSK, the conventional implementation would require 16 ADCs, whereas only one ADC is needed to obtain soft-decision information using an embodiment of this invention.

Moreover, in the devices described herein, a single ADC may be used to demodulate hybrid modulation formats, such as a p-PPM/f-FSK hybrid signal, in which symbol information is conveyed in one of f-frequencies and p-time positions. In this case, the M-ary parameter M=f*p, and the number of bits/symbol $k=\log_2(M)=\log_2(f \cdot p)=\log_2(f)+\log_2(p)$. Using an example embodiment of this invention to receive 8-PPM/16-FSK hybrid symbols, 7-bits of (soft) information per symbol may be received with the optical front end followed by one ADC and hardware to support 4-binary comparisons.

The optical elements in the front end may have wide optical bandwidths, exceeding many THz, and, therefore, capable of accommodating numerous wide-band optical signals that may support ultra-high (GHz-class to 100+ GHz-class) data rates with good sensitivity. The binary comparisons may be achieved using all-optical switching techniques or using more conventional optical-to-electronic (O-E) conversion using high-speed photo-detectors followed by electronic comparators or decision circuitry. Since commercially available photodetectors and comparators have bandwidths exceeding 40 GHz, a 40+ Gsymbol/s 16-FSK receiver using elements of embodiments of this invention may support 160+ Gbps data rates, with the 4-bits from each symbol separated into four 40 GHz data streams.

Another useful aspect of embodiments of this invention is the ability to reconfigure and optimize such an M-FSK. This may enable, for example, a single 16-FSK receiver to leverage common hardware elements to demodulate up to two 8-FSK signals, four 4-FSK signals, eight 2-FSK signals, and sixteen WDM-OOK signals. Such implementation may be achieved with integrated photonics, which may implement all of the needed elements including low-power variable optical attenuators (VOAs) in a small form factor. The VOAs may be used as optical switching elements or as trimming elements, enabling reconfiguration or proper power balancing needed for optimized performance.

Yet another aspect of embodiments of this invention is the use of multi-mode optics to reduce insertion losses and increase reconfigurable functionality with fewer optical elements. For example, high-speed (greater than 10 GHz-class) photodetectors may be procurred with multi-mode input fiber.

The example embodiments of the invention described herein enable wide-band M-FSK optical receivers which may support ultra-high-speed optical communications with greatly simplified implementation. Hard decision M-FSK reception may be implemented with only $k=\log_2(M)$ binary comparisons, and may support ultra-high data rates (e.g., greater than 160 Gbps) with good sensitivity. The addition of a single ADC enables soft decision FEC as well as hybrid modulation formats (e.g., PPM/FSK hybrids). Conventional M-FSK receivers, in comparison, would require M-ADCs.

Relative to differential phase shift keying (DPSK), which is an established high-speed high-sensitivity modulation format, the sensitivity of an 8-FSK receiver using embodiments of this invention has been demonstrated to be better than DPSK theory, and requires only $1/\log_2(M)$ or ⅓ the electronic bandwidth.

Relative to M-PPM, M-FSK in theory provides the same sensitivity but with M-times lower peak power and electronic bandwidth. Thus, for ultra-high-sensitivity applications (including those using photon-counting receivers) that are limited by electronic bandwidths, M-FSK may extend data rates by a factor of M. As a result, this high-speed high-sensitivity receiver facilitates the use of M-FSK waveforms, which are much more suitable than M-PPM waveforms in nonlinear-limited designs such as high-power optical amplifiers and (long-haul) fiber-optic communications. Moreover, with high data rates (R) conveyed at $R/\log_2(M)$ symbol rates, M-FSK waveforms are much more tolerant in dispersion-limited channels (e.g., optical fiber).

The reconfigurable/adjustable elements of embodiments of this invention allow a single receiver to re-use elements to implement different demodulation functions, e.g., a 16-FSK receiver may be reconfigured to 4-FSK receivers. Moreover, the adjustable elements enable trimming such that the performance of a single receiver may be optimized to compensate for manufacturing variances (thus increasing the yield and reducing cost) and accommodate a wide range of wavelengths and modulation formats.

The multi-mode aspects of this invention simplify/enhance reconfiguration options while reducing optical insertion loss.

Lastly, the parallel receiver of embodiments of this invention enables high-sensitivity reception of a variety of modulation formats at high rates using wide-band optical signaling. This combination together with the ability to reconfigure may be used to provide enhanced means of secure communications—which are hard to detect and demodulate.

EXEMPLIFICATION

Figure 11A:
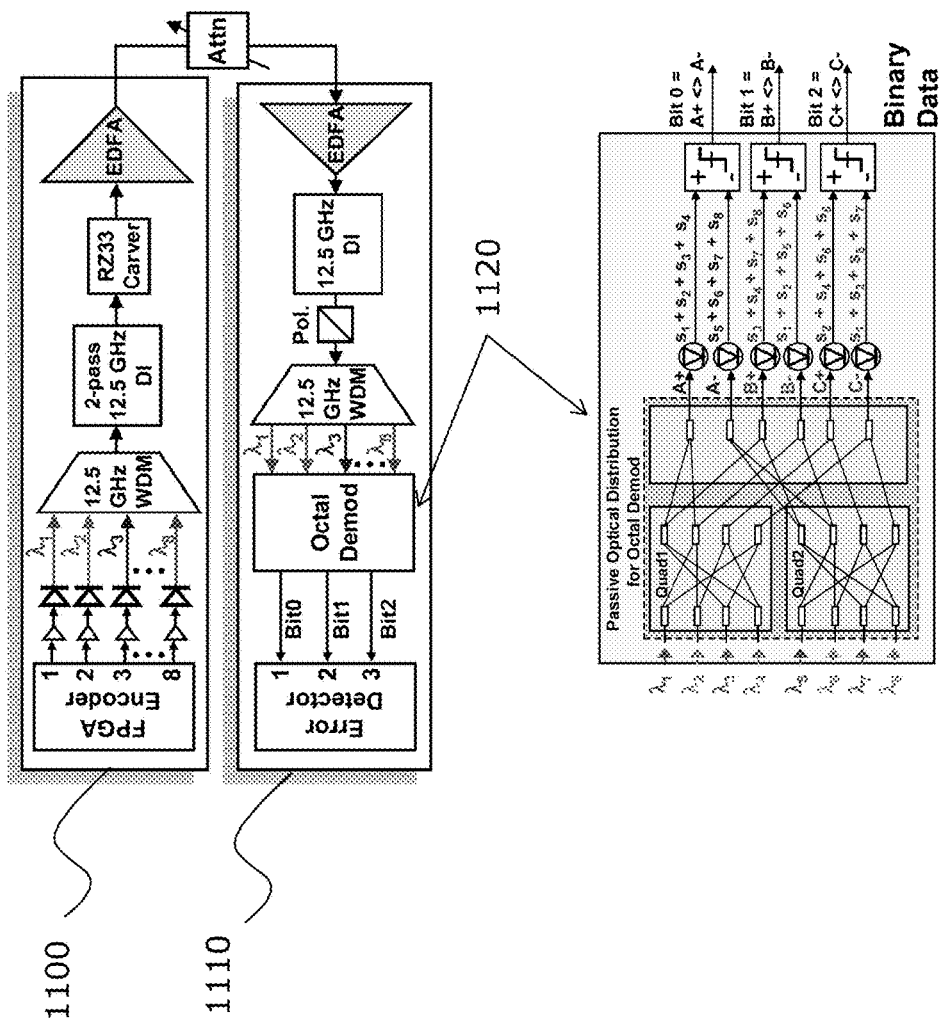
FIG. 11A is a block diagram of an experimental setup for measuring the communication performance of an example embodiment of a receiver of the present invention.

FIG. 11A is a block diagram of a transmitter 1100 and a receiver 1110, setup for measuring the communication performance of an example embodiment of a receiver of the present invention. This setup was used to obtain data presented in FIG. 11B. Receiver 1110 includes optical distribution matrix 1120 configured for demodulating a signal encoded in 8-ary FSK format.

In the setup shown in FIG. 11A, an 8-FSK transmitter 1100 is conveying 3 bits/symbol at a rate of 2.5 Gsymbols/sec (for an aggregate data rate of 7.5 Gbit/s) and an 8-FSK receiver 1110 is configured to experimentally measure the receiver sensitivity. The 8-FSK receiver 1110 includes a single polarization optical-preamplifier, and optical preprocessor that includes a 12.5 GHz WDM implemented with an arrayed waveguide grating router (AWGR) and 12.5 GHz delay-line interferometer (DI) with a net transfer function that is nearly-matched to the 33% RZ waveforms generated by the transmitter.

Figure 11B:
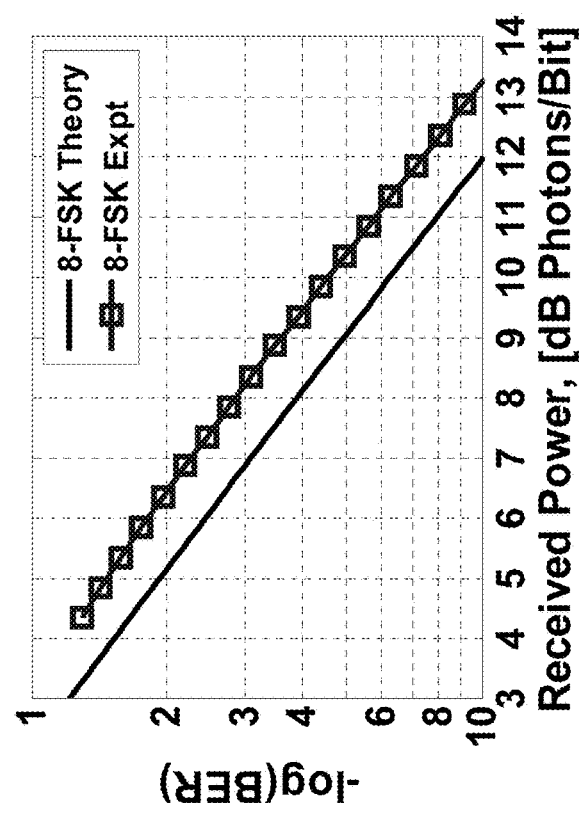
FIG. 11B is a plot showing bit error rate as a function of received power.

The results of the measurement are presented in FIG. 11B, which is a plot showing bit error rate as a function of received power. The plot shown in FIG. 11B demonstrates that measured 8-FSK bit-error-rate (BER) performance is within 1.5 dB from quantum-limited theory corresponding to less than 20 photons/bit at $10^{-9}$ BER. This is better than 2-DP_SK theory. The sensitivity of the receiver employed in this experiment is among the highest reported in the absence of a forward error correction, especially for the data rates of greater than 1 Gbit/s.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An optical demodulator, comprising:
    an optical processor with a matrix of couplers configured to add M input optical signals with weighting factors to transform the M input optical signals into $2 \times \log_2 M$ distinct intermediary optical signals, the M input optical signals representing input data, wherein M is an integer greater than 2; and
    a comparison module, optically connected to the optical processor, said comparison module configured to compare optical power of the $2 \times \log_2 M$ distinct intermediary optical signals to determine a logical representation of the input data, the weighting factors enabling the logical representation to be determined.

2. The optical demodulator of claim 1, wherein the input data is encoded in an M-ary orthogonal modulation format.

3. The optical demodulator of claim 1, further including an optical preprocessor configured to separate the input data into M parallel input optical signals.

4. The optical demodulator of claim 1, the logical representation of the input data including a set of k bits, k being equal to $\log_2 M$, the comparison module being configured to perform k binary comparisons of optical powers of the intermediary optical signals.

5. The optical demodulator of claim 1, further including at least one variable optical attenuator configured to control the addition of at least two input optical signals.

6. The optical demodulator of claim 1, wherein the matrix of couplers forms part of an optical distribution matrix comprising at least M waveguides and at least M optical couplers.

7. The optical demodulator of claim 1, the matrix of couplers being further configured to add the M input optical signals to produce auxiliary optical signals and to further add the auxiliary optical signals to produce $2 \times \log_2 M$ comparable signals.

8. The optical demodulator of claim 1 further including a level estimator employing an Analog-to-Digital Converter (ADC), the level estimator configured to determine a confidence level of logical representations of the input data.

9. The optical demodulator of claim 8, further including a forward error correction module to correct the logical representation of the input data as a function of the confidence level.

10. The optical demodulator of claim 2 further including a periodic filter matched to the optical waveform of the symbols of the orthogonal modulation format.

11. The optical demodulator of claim 2, the M-ary modulation format being an M-ary frequency shift keying (M-FSK) format.

12. The optical demodulator of claim 2, the M-ary modulation format being an M-ary pulse-position modulation (M-PPM) format.

13. The optical demodulator of claim 2, the M-ary orthogonal modulation format being a hybrid f-FSK/p-PPM/L-PoLSK format, where $M = f \cdot p \cdot L$, wherein f, p, and L each independently is a positive integer number.

14. The optical demodulator of claim 2, further including at least one variable optical attenuator configured to control the addition of at least two input optical signals, and wherein said optical demodulator is reconfigurable to demodulate input data encoded by two or more orthogonal modulation formats.

15. An optical transceiver comprising the optical demodulator of claim 1, further including a parallel transmitter configured to transmit data encoded in an M-ary orthogonal modulation format.

16. A method of optically demodulating input data, the method comprising:
    transforming M input optical signals into $2 \times \log_2 M$ distinct intermediary optical signals by adding the M input optical signals with weighting factors, the M input optical signals representing input data, M being greater than 2; and
    comparing optical power of the $2 \times \log_2 M$ distinct intermediary optical signals to determine a logical representation of the input data, the weighting factors enabling the logical representation to be determined.

17. The method of claim 16, wherein the input data is encoded in an M-ary orthogonal modulation format.

18. The method of claim 16, further including optically preprocessing the input data into the M input optical signals.

19. The method of claim 16, further including performing k binary comparisons of optical powers of the intermediary optical signals, k being equal to $\log_2 M$, the logical representation of the input data including a set of k bits.

20. The method of claim 16, further including controlling the addition of at least two input optical signals by at least one variable optical attenuator.

21. The method of claim 16, further including adding the M input optical signals to produce auxiliary optical signals and further adding the auxiliary optical signals to produce $2 \times \log_2 M$ comparable signals.

22. The method of claim 16 further including determining a confidence level of logical representations of the input data.

23. The method of claim 22, further including correcting the logical representation of the input data as a function of the confidence level by a forward error correction method.

24. The method of claim 17, further including filtering the M input optical signals by a periodic filter matched to the optical waveform of the symbols of the orthogonal modulation format.

25. The method of claim 17, the M-ary modulation format being an M-ary frequency shift keying (M-FSK).

26. The method of claim 17, the M-ary modulation format being an M-ary pulse-position modulation (M-PPM).

27. The method of claim 17, the M-ary orthogonal modulation format being a hybrid f-FSK/p-PPM/L-PoLSK format, where f, p, and L each independently is a positive integer number.

28. An optical demodulator, comprising:
   an optical processor with a matrix of couplers configured to add M parallel input optical signals with weighting factors to transform the M parallel input optical signals into $2 \times \log_2 M$ distinct intermediary optical signals, the M input optical signals representing input Gala, wherein M is an integer greater than 2; and
   a comparison module, optically connected to the optical processor, said comparison module configured to compare optical power of the $2 \times \log_2 M$ distinct intermediary optical signals to determine a logical representation of the input data, the weighting factors enabling the logical representation to be determined.

29. The optical demodulator of claim 28, wherein the M input optical signals are encoded in an M-ary orthogonal modulation format.

\* \* \* \* \*

UNITED STATES PATENT AND TRADEMARK OFFICE
CERTIFICATE OF CORRECTION

PATENT NO. : 10,009,115 B2  
APPLICATION NO. : 13/462555  
DATED : June 26, 2018  
INVENTOR(S) : David O. Caplan It is certified that error appears in the above-identified patent and that said Letters Patent is hereby corrected as shown below:

In the Claims

In Claim 28, Column 15, Line 18, delete "Gala" and insert --data--.

Signed and Sealed this
Twenty-eighth Day of August, 2018

Andrei Iancu
*Director of the United States Patent and Trademark Office*